(12) United States Patent
Xu

(10) Patent No.: US 10,291,740 B2
(45) Date of Patent: May 14, 2019

(54) METHOD AND APPARATUS FOR DETERMINING APPLICATION TO BE RECOMMENDED

(71) Applicant: Lenovo (Beijing) Co., Ltd., Beijing (CN)

(72) Inventor: Lin Xu, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 306 days.

(21) Appl. No.: 14/661,093

(22) Filed: Mar. 18, 2015

(65) Prior Publication Data
US 2016/0065437 A1    Mar. 3, 2016

(30) Foreign Application Priority Data

Sep. 3, 2014  (CN) .......................... 2014 1 0447060
Sep. 5, 2014  (CN) .......................... 2014 1 0453723

(51) Int. Cl.
  G06F 1/16     (2006.01)
  G06Q 30/06    (2012.01)
  H04L 29/08    (2006.01)

(52) U.S. Cl.
  CPC .......... H04L 67/303 (2013.01); G06F 1/162 (2013.01); G06F 1/1615 (2013.01);
  (Continued)

(58) Field of Classification Search
  CPC .. G06F 17/30867; G06F 1/162; G06F 1/1615; H04L 67/10; H04L 67/1095; H04L 67/303; H04L 67/22; G06Q 30/0631
  See application file for complete search history.

(56) References Cited

U.S. PATENT DOCUMENTS 7,506,152 B2   3/2009   Park et al.
7,899,813 B2   3/2011   Song et al.
                (Continued)

FOREIGN PATENT DOCUMENTS

CN      1848761 A      10/2006
CN    101639766 A       2/2010
                (Continued)

OTHER PUBLICATIONS

Smith, Andrea, Must-Have Free Tablet Apps for Convertible Laptops, Jan. 16, 2014, https://www.techlicious.com/guide/must-have-free-tablet-apps-for-convertible-laptops/, pp. 1-4. (Year: 2014).*

(Continued)

*Primary Examiner* — Gregory G Todd
(74) *Attorney, Agent, or Firm* — Harness, Dickey & Pierce, P.L.C.

(57) ABSTRACT

A method and apparatus for determining an application to be recommended are provided. The method includes: obtaining mode identification information of a usage mode used by each of a plurality of terminal devices and application identification information of an application run in the usage mode used by each of the plurality of terminal devices which are sent from each of the plurality of terminal devices; gathering the mode identification information and the application identification information sent from the plurality of terminal devices; and determining an application meeting a predetermined condition for each usage mode based on the gathered mode identification information and application identification information, where the application meeting the predetermined condition for each usage mode is an application to be recommended for each usage mode.

11 Claims, 17 Drawing Sheets

(52) U.S. Cl.
CPC ..... *G06Q 30/0631* (2013.01); *H04L 67/1095* (2013.01); *H04L 67/22* (2013.01)

(56) References Cited

U.S. PATENT DOCUMENTS

| | | | |
|---|---|---|---|
| 7,979,426 | B2 | 7/2011 | Jeong et al. |
| 8,019,782 | B2 | 9/2011 | Song et al. |
| 8,032,468 | B2 | 10/2011 | Song et al. |
| 8,046,454 | B2 | 10/2011 | Song et al. |
| 8,166,052 | B2 | 4/2012 | Song et al. |
| 8,171,035 | B2 | 5/2012 | Song et al. |
| 8,478,747 | B2 | 7/2013 | Jeong et al. |
| 8,521,750 | B2 | 8/2013 | Song et al. |
| 8,554,767 | B2 | 10/2013 | Song et al. |
| 8,788,944 | B1* | 7/2014 | Gill .................. G06F 8/61 715/744 |
| 2005/0038982 | A1* | 2/2005 | Park .................. G06F 1/162 713/1 |
| 2009/0055132 | A1 | 2/2009 | Cheng et al. |
| 2009/0055334 | A1 | 2/2009 | Song et al. |
| 2009/0055523 | A1 | 2/2009 | Song et al. |
| 2009/0105987 | A1 | 4/2009 | Song et al. |
| 2009/0106304 | A1 | 4/2009 | Song et al. |
| 2009/0106314 | A1 | 4/2009 | Song et al. |
| 2009/0177689 | A1 | 7/2009 | Song et al. |
| 2009/0307176 | A1 | 12/2009 | Jeong et al. |
| 2009/0307262 | A1 | 12/2009 | Jeong et al. |
| 2010/0161544 | A1 | 6/2010 | Song et al. |
| 2011/0300834 | A1* | 12/2011 | Ni .................. G06Q 30/02 455/414.1 |
| 2012/0191706 | A1 | 7/2012 | Song et al. |
| 2013/0151595 | A1* | 6/2013 | Fernandez-Ruiz ..... H04L 67/10 709/203 |
| 2013/0290369 | A1* | 10/2013 | Sayers ............ H04L 67/22 707/769 |
| 2014/0052683 | A1* | 2/2014 | Kirkham .......... G06Q 30/0631 706/46 |
| 2014/0074601 | A1* | 3/2014 | Delug ............ G06Q 30/02 705/14.53 |
| 2014/0074653 | A1* | 3/2014 | Wang ............ G06Q 30/0631 705/26.7 |
| 2014/0101611 | A1* | 4/2014 | Lang .................. G06F 21/32 715/813 |
| 2014/0114901 | A1* | 4/2014 | Pradhan ............ G06Q 30/0631 706/50 |
| 2014/0289382 | A1* | 9/2014 | Chan ................ G06F 9/54 709/221 |
| 2014/0317031 | A1* | 10/2014 | Babenko ........... G06F 17/30017 706/12 |
| 2015/0208205 | A1* | 7/2015 | Chan ................ H04L 67/1095 709/217 |
| 2015/0222700 | A1* | 8/2015 | Kay ................ H04L 67/1095 709/203 |
| 2015/0331685 | A1* | 11/2015 | Bourke ............ G06F 8/61 717/174 |

FOREIGN PATENT DOCUMENTS

| | | |
|---|---|---|
| CN | 101923474 A | 12/2010 |
| CN | 103399967 A | 11/2013 |
| CN | 103617075 A | 3/2014 |
| CN | 103631366 A | 3/2014 |
| CN | 103646020 A | 3/2014 |
| CN | 103685716 A | 3/2014 |
| CN | 103701836 A | 4/2014 |
| CN | 103841495 A | 6/2014 |

OTHER PUBLICATIONS

First German Office Action regarding Application No. DE102015105010.2 dated Sep. 12, 2017. English summary provided by Unitalen Attorneys at Law.

Bohmer, Matthias et al., "Exploring the Design Space of Context-aware Recommender Systems that Suggest Mobile Applications," CARS-2010, Barcelona, Spain, Sep. 26, 2010.

Office Action regarding Chinese Patent Application No. 201410447060.8, dated Feb. 24, 2018. Translation provided by Unitalen Attorneys at Law.

Office Action regarding Chinese Patent Application No. 201410453723.7, dated Mar. 14, 2018. Translation provided by Unitalen Attorneys At Law.

\* cited by examiner

METHOD AND APPARATUS FOR DETERMINING APPLICATION TO BE RECOMMENDED

This application claims priority to Chinese patent application No. 201410453723.7, filed with the Chinese State Intellectual Property Office on Sep. 5, 2014, and Chinese patent application No. 201410447060.8, filed with the Chinese State Intellectual Property Office on Sep. 3, 2014, which are incorporated herein by reference in their entireties.

FIELD

The disclosure relates to the field of information processing, and in particular to a method and apparatus for determining an application to be recommended.

BACKGROUND

With the development of intelligent operating systems such as Android and IOS, multiple usage modes are provided for the terminal device to meet working and entertainment requirements. For example, both a notebook mode and a tablet mode are provided for a terminal device. The terminal device having multiple usage modes can switch its usage mode among the multiple usage modes to meet different usage requirements. For example, the user may activate the notebook mode of the terminal device and operate the terminal device by means of cursor and keyboard for working, and the user may activate the tablet mode of the terminal device and operate the terminal device by means of touching for entertainment.

Generally, the user uses different applications in different usage modes, hence it is difficult to accurately recommend applications for different usage modes. The application to be recommended is determined firstly, and then the application to be recommended is recommended. Currently, the application to be recommended is determined by determining recommending priorities for applications based on the download amounts of the applications and determining the application with the highest download amount as the application to be recommended. However, the application to be recommended determined in this way is usually not the accurate common application of the terminal device in each usage mode, and the application to be recommended is not determined accurately.

In addition, the operation parameter of the terminal device such as volume and screen brightness is adjusted by a user manually, and in this adjustment way, the adjusted operation parameter may be not matched with the software usage scenario of the terminal device, which may cause unstandard operational energy consumption of software and poor operational smoothness.

SUMMARY

A method for determining an application to be recommended includes: obtaining, by a server, mode identification information of a usage mode used by each of a plurality of terminal devices and application identification information of an application run in the usage mode used by each of the plurality of terminal devices which are sent from each of the plurality of terminal devices; gathering, by the server, the mode identification information and the application identification information sent from the plurality of terminal devices; and determining, by the server, an application meeting a predetermined condition for each usage mode based on the gathered mode identification information and application identification information, where the application meeting the predetermined condition for each usage mode is an application to be recommended for each usage mode.

Another method for determining an application to be recommended includes: detecting, by a terminal device, a usage mode used by the terminal device and an application run in the usage mode used by the terminal device; and sending, by the terminal device, mode identification information of the usage mode and application identification information of the application to a server, so that the server obtains the mode identification information and the application identification information sent from the terminal device, gathers the mode identification information and the application identification information sent from a plurality of terminal devices and determines an application meeting a predetermined condition for each usage mode based on the gathered mode identification information and application identification information, where the application meeting the predetermined condition for each usage mode is an application to be recommended for each usage mode.

An apparatus for determining an application to be recommended includes: a first obtaining module, configured to obtain mode identification information of a usage mode used by each of a plurality of terminal devices and application identification information of an application run in the usage mode used by each of the plurality of terminal devices which are sent from the terminal device; a gathering module, configured to gather the mode identification information and the application identification information sent from the plurality of terminal devices; and a to-be-recommended application determining module, configured to determine an application meeting a predetermined condition for each usage mode based on the gathered mode identification information and application identification information, where the application meeting the predetermined condition for each usage mode is an application to be recommended for each usage mode.

Another apparatus for determining an application to be recommended includes: a detection module, configured to detect a usage mode used by a terminal device and an application run in the usage mode used by the terminal device; and a sending module, configured to send mode identification information of the usage mode and application identification information of the application to a server, so that the server obtains the mode identification information and the application identification information sent from the terminal device, gathers the mode identification information and the application identification information sent from a plurality of terminal devices and determines an application meeting a predetermined condition for each usage mode based on the gathered mode identification information and application identification information, where the application meeting the predetermined condition for each usage mode is an application to be recommended for each usage mode.

BRIEF DESCRIPTION OF THE DRAWINGS

In order to illustrate the technical solutions in embodiments of the disclosure more clearly, the drawings for the description of the embodiments will be introduced simply. Apparently, the drawings described below are only some embodiments of the disclosure, and other drawings may be obtained based on the provided drawings by those skilled in the art without any creative work.

DETAILED DESCRIPTION

The technical solutions of the embodiments of the disclosure will be described clearly in conjunction with the drawings of the embodiments of the disclosure hereinafter. Apparently, the described embodiments are only some but not all of embodiments of the disclosure. All other embodiments obtained based on the embodiments of the disclosure by those skilled in the art without any creative work fall within the scope of protection of the disclosure.

Figure 1:
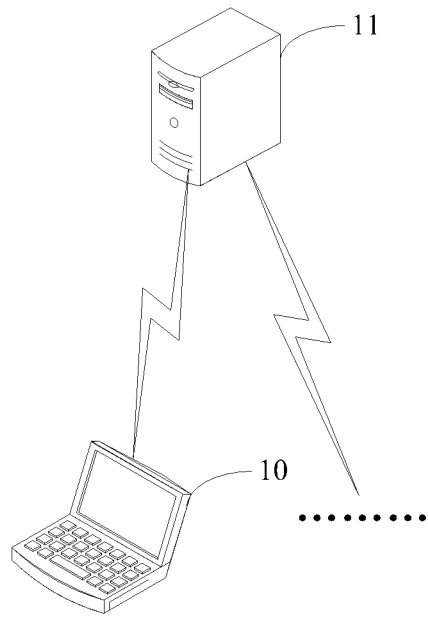
FIG. 1 is a structural diagram of a system for determining an application to be recommended according to an embodiment of the disclosure.

FIG. 1 is structural diagram of a system for determining an application to be recommended according to an embodiment of the disclosure. The system may be used to implement the method for determining an application to be recommended according to an embodiment of the disclosure. Referring to FIG. 1, the system includes a plurality of terminal devices 10 and a server 11. The terminal device 10 may have multiple usage modes such as a notebook mode and a tablet mode. The server 11 may be an independent server or server farms including a plurality of servers.

In the embodiment of the disclosure, each terminal device 10 detects its usage mode and an application run in the usage mode, and sends mode identification information of the usage mode and application identification information of the application to the server 11.

The server 11 may obtain the mode identification information of the usage mode used by each terminal device 10 and the application identification information of the application run in the usage mode used by each terminal device 10 from each terminal device 10; gather the mode identification information and the application identification information sent from the terminal devices 10; and determine an application meeting a predetermined condition for each usage module based on the gathered mode identification information and application identification information. The application meeting the predetermined condition for each usage mode is an application to be recommended for each usage mode.

Optionally, after determining the application to be recommended for each usage mode, the server 11 may obtain application information of the application to be recommended for each usage mode, generate application recommending information including the application information for each usage mode, and send the application recommending information to the terminal device 10 under the corresponding usage mode.

Accordingly, the terminal device 10 may receive the application recommending information corresponding to the current usage mode of the terminal device 10.

In the embodiment of the disclosure, each terminal device may send mode identification information of its usage mode and application identification information of the application run in the usage mode to the server, so that the server may determine the application to be recommended for each usage mode based on the gathered mode identification information and application identification information sent from the terminal devices. Hence, the application to be recommended for each usage mode can be determined accurately.

Hereinafter a method for determining an application to be recommended according to an embodiment of the disclosure will be described from a perspective of a server.

Figure 2:
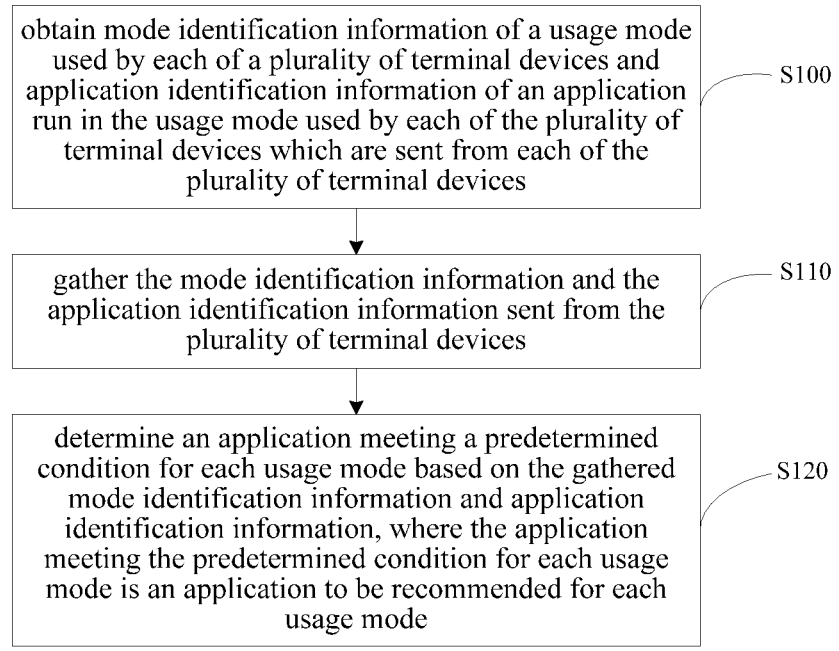
FIG. 2 is a first flowchart of a method for determining an application to be recommended according to an embodiment of the disclosure.

FIG. 2 is a first flowchart of a method for determining an application to be recommended according to an embodiment of the disclosure. The method is applied to a server. Referring to FIG. 2, the method includes step S100 to step S120.

In step S100, mode identification information of a usage mode used by each of a plurality of terminal devices and application identification information of an application run in the usage mode used by each of the plurality of terminal devices are obtained from each of the plurality of terminal devices.

Optionally, mode identification information of multiple usage modes of the terminal device may be defined in the disclosure, for distinguishing the multiple usage modes of the terminal device. For example, the terminal device has a notebook mode and a tablet mode, it may be defined that mode identification information of the notebook mode is mode 1 and mode identification information of the tablet mode is mode 2. Apparently, there are also other manners for defining the mode identification information, as long as the usage modes of the terminal device can be distinguished. For example, the mode identification information of the notebook mode is defined as a notebook mode and the mode identification information of the tablet mode is defined as a tablet mode directly.

The application identification information may be identification information which can be used to uniquely identify an application, for example, an application package name or an application name of the application. The application identification information can be used to distinguish applications.

Optionally, the terminal device may regularly detect its current usage mode and the application run in the current usage mode and send the mode identification information of the current usage mode and the application identification information of the application run in the current usage mode to the server. Optionally, the terminal device may detect, when starting an application in a certain usage mode, its current usage mode and the application started in the current usage mode, and send the mode identification information of the current usage mode and the application identification information of the application started in the current usage mode to the server. Optionally, the terminal device may detect, upon reception of a detection request sent by the server, its current usage mode and the application run in the current usage mode, and may send the mode identification information of the current usage mode and the application identification information of the application run in the current usage mode to the server.

In step S110, the mode identification information and the application identification information sent from the plurality of terminal devices are gathered.

Optionally, one mode identification information corresponds to one application identification information, which indicates that a terminal device uses an application in a usage mode. The server may gather the mode identification information and the application identification information sent from the terminal devices.

Optionally, different gathering strategies may be defined. For example, mode identification information and application identification information sent from terminal devices located in a certain region (for example, a certain country, a certain province, or even the whole world) may be gathered; mode identification information and application identification information sent from the terminal devices during a certain period of time (for example, in the morning or in the afternoon) may be gathered; or mode identification information and application identification information sent from terminal devices located in a certain region during a certain period of time may be gathered.

In step S120, an application meeting a predetermined condition for each usage mode is determined based on the gathered mode identification information and application identification information. The application meeting the predetermined condition for each usage mode is the application to be recommended for each usage mode.

One usage mode may correspond to at least one application to be recommended.

Optionally, the application meeting the predetermined condition for each usage mode may be the application with the maximum using times for each usage mode, or the first n applications of applications ranked in a descending order of the using times for each usage mode, where n may be set as needed. Specifically, in the embodiment of the disclosure, the number of pieces of each application identification information corresponding to each mode identification information may be determined based on the gathered mode identification information and application identification information, thereby the using times of the application corresponding to each application identification information in each usage mode is determined; thus the application corresponding to the maximum number of pieces of the application identification information for each usage mode is determined as the application to be recommended for each usage mode, or applications corresponding to the first n application identification information ranked in a descending order of the number of pieces of the application identification information for each usage mode are determined as the applications to be recommended for each usage mode.

Optionally, the application meeting the predetermined condition for each usage mode may be the application of a set type for each usage mode, where the type may be set as needed. Specifically, in the embodiment of the disclosure, a type of an application corresponding to each application identification information for each mode identification information may be determined based on the gathered mode identification information and application identification information, thereby application identification information corresponding to the set type for each mode identification information is determined, and the application having the application identification information corresponding to the set type for each mode identification information is determined as the application to be recommended for each usage mode.

Optionally, in the embodiment of the disclosure, the application to be recommended for each terminal device in each usage mode may be determined based on the condition of the usage of the applications used by each terminal device in each usage mode. For example, in the embodiment of the disclosure, the type of the application with the maximum using times used by a terminal device in each usage mode may be determined based on mode identification information and application identification information sent from the terminal device, where one usage mode corresponds to one determined type; thereby the application of the determined type for each usage mode is determined based on the gathered mode identification information and application identification information; and the application of the determined type for each usage mode is determined as the application to be recommended for each usage mode.

Apparently, the predetermined condition may be set as needed, which is not limited in the disclosure.

In the method for determining an application to be recommended provided by the embodiment of the disclosure, the server may obtain from each terminal device the mode identification information of a usage mode used by each terminal device and application identification information of an application run in the usage mode used by each terminal device; gather mode identification information and application identification information sent from each terminal device; and determine an application meeting a predetermined condition for each usage mode based on the gathered mode identification information and application identification information, where the application meeting the predetermined condition for each usage mode is the application to be recommended for each usage mode. In the embodiment of the disclosure, each terminal device may send mode identification information of its usage mode and application identification information of an application run in the usage mode to the server, so that the server may determine the application to be recommended for each usage mode based on the gathered mode identification information and application identification information sent from the terminal devices, hence the application to be recommended for each usage mode is determined accurately.

Figure 3:
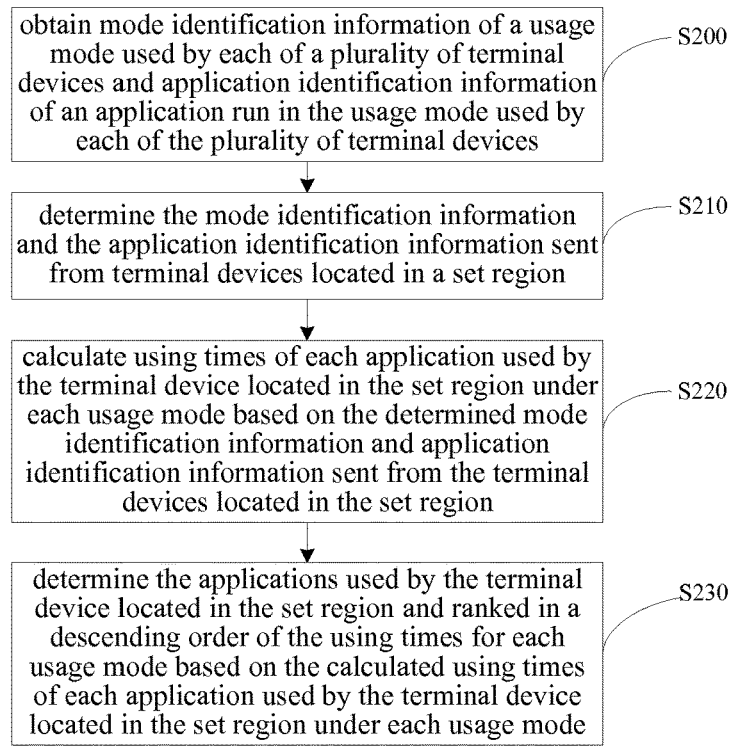
FIG. 3 is a second flowchart of a method for determining an application to be recommended according to an embodiment of the disclosure.

Optionally, in the embodiment of the disclosure, mode identification information and application identification information sent from terminal devices located in a set region may be gathered, and the applications used by each terminal device located in the set region and ranked in a descending order of using times for each usage mode is determined as the applications to be recommended. FIG. 3 illustrates a second flowchart of a method for determining an application to be recommended according to an embodiment of the disclosure. Referring to FIG. 3, the method includes step S200 to step S230.

In step S200, mode identification information of a usage mode used by each of a plurality of terminal devices and application identification information of an application run in the usage mode used by each of the plurality of terminal devices, which are sent from each of the plurality of terminal devices, are obtained.

In step S210, the mode identification information and the application identification information sent from terminal devices located in a set region are determined.

Optionally, in the embodiment of the disclosure, an IP address of a terminal device may be determined based on information sent from the terminal device, thereby the region where the terminal device is located is determined, and thus the mode identification information and application identification information sent from the terminal device located in the set region are determined.

Optionally, for each terminal device, the terminal device may also send region identification information of the region where the terminal device is located while sending the mode identification information and application identification information, thereby the mode identification information and application identification information sent from the terminal device which also sends set region identification information are determined. The set region identification information corresponds to the set region.

In step S220, using times of each application used by the terminal device located in the set region under each usage mode is calculated based on the determined mode identification information and application identification information sent from the terminal devices located in the set region.

In step S230, the applications used by the terminal device located in the set region and ranked in a descending order of the using times for each usage mode are determined based on the calculated using times of each application used by the terminal device located in the set region under each usage mode.

The applications used by the terminal device located in the set region and ranked in a descending order of the using times for each usage mode is the applications to be recommended for the terminal device located in the set region for each usage mode.

In the embodiment of the disclosure, the first n applications of applications ranked in a descending order of the using times for each usage mode may be determined as the applications to be recommended for each usage mode; or all of the applications ranked in a descending order of the using times for each usage mode may be determined as the applications to be recommended for each usage mode.

Optionally, in the embodiment of the disclosure, after the mode identification information and application identification information sent from the terminal device located in the set region are determined, it is not necessarily to determine the applications used by the terminal device located in the set region and ranked in a descending order of the using times for each usage mode as the applications to be recommended for each usage mode, and the application to be recommended for each usage mode may be determined by using other strategies. For example, the application to be recommended for each usage mode may be determined based on a set application type for each usage mode.

Figure 4:
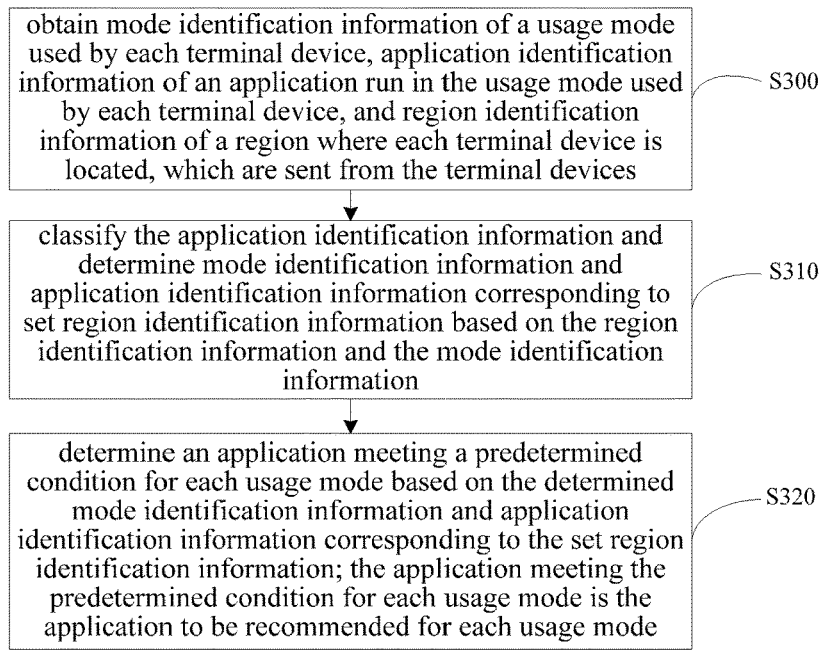
FIG. 4 is a third flowchart of a method for determining an application to be recommended according to an embodiment of the disclosure.

Optionally, for each terminal device, the terminal device may also send region identification information of the region where the terminal device is located while sending the mode identification information and application identification information, so that the server determines the mode identification information and application identification information sent from the terminal device located in the set region. FIG. 4 illustrates a third flowchart of a method for determining an application to be recommended according to an embodiment of the disclosure. Referring to FIG. 4, the method includes step S300 to step S320.

In step S300, mode identification information of a usage mode used by each of a plurality of terminal devices, application identification information of an application run in the usage mode used by each of the plurality of terminal devices, and region identification information of a region where each of the plurality of terminal devices is located, which are sent from each of the plurality of terminal devices, are obtained.

In step S310, the application identification information is classified and mode identification information and application identification information corresponding to set region identification information are determined based on the region identification information and the mode identification information. The set region identification information corresponds to the set region.

In step S320, an application meeting a predetermined condition for each usage mode is determined based on the determined mode identification information and application identification information corresponding to the set region identification information; and the application meeting the predetermined condition for each usage mode is the application to be recommended for each usage mode.

Optionally, the application meeting the predetermined condition for each usage mode may be an application with a maximum using times in each usage mode or the first n applications of applications ranked in a descending order of the using times in the usage mode, among the determined mode identification information and application identification information corresponding to the set region identification information (i.e., the application corresponding to the application identification information the number of pieces of which is maximum in each mode identification information, or applications corresponding to the first n application identification information ranked in a descending order of the number of pieces of the application identification information in each usage mode). The application meeting the predetermined condition for each usage mode may also be an application of a set type for each usage mode, among the determined mode identification information and application identification information corresponding to the set region identification information (i.e., the application corresponding to the application identification information of a set type for each usage mode).

Figure 5:
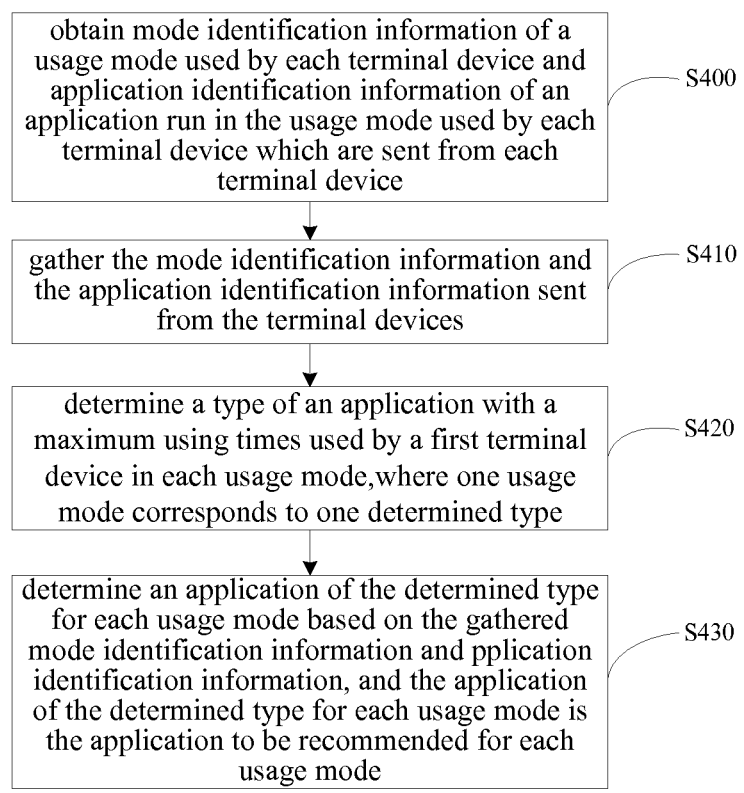
FIG. 5 is a fourth flowchart of a method for determining an application to be recommended according to an embodiment of the disclosure.

Optionally, in the embodiment of the disclosure, the application to be recommended for each terminal device in each usage mode may also be determined based on conditions of usage of applications used by each terminal device in each usage mode. FIG. 5 illustrates a fourth flowchart of a method for determining an application to be recommended according to an embodiment of the disclosure. Referring to FIG. 5, the method includes step S400 to step S430.

In step S400, mode identification information of a usage mode used by each of a plurality of terminal devices and application identification information of an application run in the usage mode used by each of the plurality of terminal devices, which are sent from each of the plurality of terminal devices, are obtained.

In step S410, the mode identification information and the application identification information sent from the plurality of terminal devices are gathered.

Optionally, mode identification information and application identification information sent from the terminal device located in a set region may be gathered, and the specific implementation thereof may refer to the corresponding description above. Optionally, mode identification information and application identification information sent form a terminal device located in a set region during a set period of time may be gathered (optionally, the terminal device may send time information indicating the current time while sending the mode identification information and corresponding application identification information, so that the server judges whether the time when the terminal device sends the mode identification information and application identification information corresponds to a set period of time).

In step S420, a type of an application with a maximum using times used by a first terminal device in each usage mode is determined One usage mode corresponds to one determined type.

Optionally, the first terminal device may be any terminal device or a terminal device to which an application is to be recommended. In the embodiment of the disclosure, the mode identification information and application identification information sent from a first terminal device may be determined based on the gathered mode identification information and application identification information (optionally, the terminal device may send an identification of the terminal device while sending the mode identification information and application identification information, so that the server can distinguish the first terminal device and determines the mode identification information and application identification information sent from the first terminal device). A type of an application with a maximum using times used by the first terminal device in each usage mode may be determined based on the mode identification information and application identification information sent from the first terminal device. For example, in the embodiment of the disclosure, application identification information the number of pieces of which is maximum for each mode identification information sent from the first terminal device may be determined, and thereby a type of an application corresponding to the application identification information the number of pieces of which is maximum is determined. The type of the application may include a communication type of application, an entertaining type of application and a map type of application and so on.

In step S430, an application of the determined type for each usage mode is determined based on the gathered mode identification information and application identification information, and the application of the determined type for each usage mode is the application to be recommended for each usage mode.

Optionally, in the embodiment of the disclosure, a type of the application corresponding to application identification information for each mode identification information may be determined based on the gathered mode identification information and application identification information; and application identification information corresponding to the determined type for each mode identification information is determined; and an application corresponding to the determined application identification information is determined as the application of the determined type for each usage mode, where the determined application for each usage mode is the application to be recommended for each usage mode for the first terminal device.

Optionally, after the type of the application with the maximum using times for each usage mode is determined, multiple types are obtained, and one usage mode corresponds to one type. In the embodiment of the disclosure, an application of a type for each usage mode may be determined based on the gathered mode identification information and application identification information. For example, if an application type A corresponds to a usage mode 1 of the first terminal and an application type B corresponds to a usage mode 2 of the first terminal, the application of the type A for the usage mode 1 and the application of the type B for the usage mode 2 may be determined based on the gathered mode identification information and application identification information.

Figure 6:
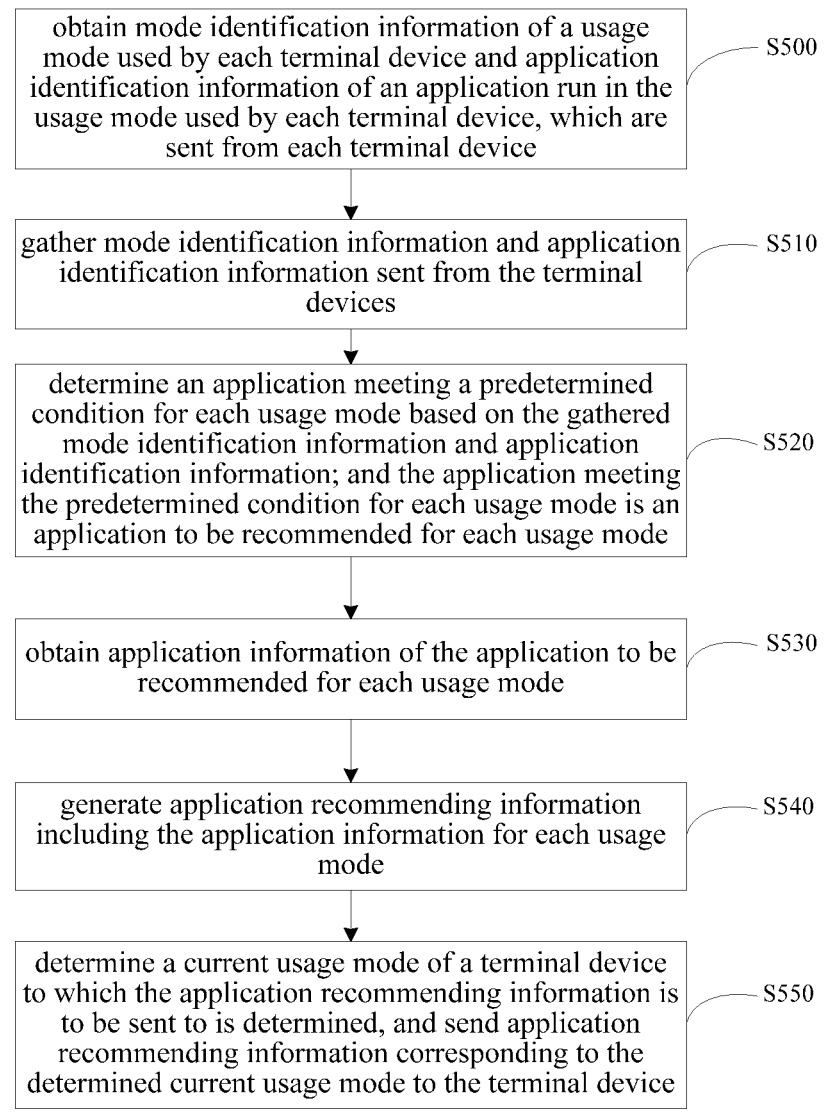
FIG. 6 is a fifth flowchart of a method for determining an application to be recommended according to an embodiment of the disclosure.

Optionally, in the embodiment of the disclosure, after the application to be recommended for each usage mode is determined, application information of the application to be recommended for each usage mode may be obtained and application recommending information for each usage mode may be generated, then application recommending information corresponding to the current usage mode of the terminal device may be sent to the terminal device. FIG. 6 illustrates a fifth flowchart of a method for determining an application to be recommended according to an embodiment of the disclosure. Referring to FIG. 6, the method includes step S500 to step S550.

In step S500, mode identification information of a usage mode used by each of a plurality of terminal devices and application identification information of an application run in the usage mode used by each of the plurality of terminal devices, which are sent from each of the plurality of terminal devices, are obtained.

In step S510, mode identification information and application identification information sent from the plurality of terminal devices are gathered.

In step S520, an application meeting a predetermined condition for each usage mode is determined based on the gathered mode identification information and application identification information; and the application meeting the predetermined condition for each usage mode is an application to be recommended for each usage mode.

In step S530, application information of the application to be recommended for each usage mode is obtained.

In step S540, application recommending information including the application information for each usage mode is generated.

In step S550, a current usage mode of a terminal device to which the application recommending information is to be sent to is determined, and application recommending information corresponding to the determined current usage mode is sent to the terminal device.

Figure 7:
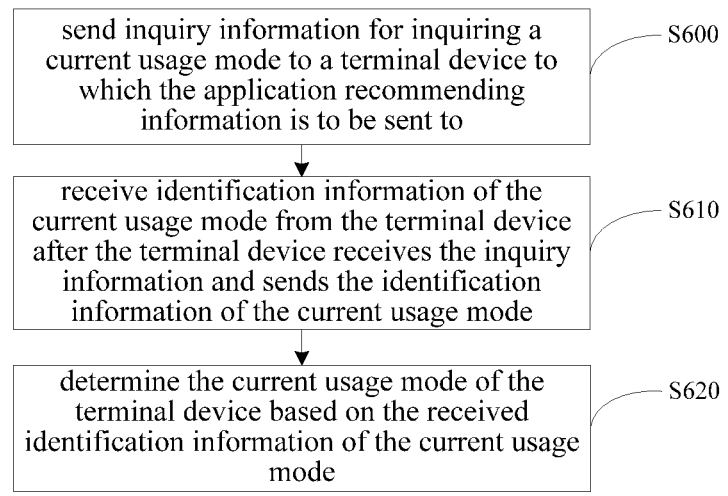
FIG. 7 is a flowchart of a method for determining a current usage mode of a terminal device according to an embodiment of the disclosure.

Optionally, the method for determining the current usage mode of the terminal device to which the application recommending information is to be sent to may be as FIG. 7. FIG. 7 is a flowchart of a method for determining a current usage mode of a terminal device to which the application recommending information is to be sent to according to an embodiment of the disclosure. Referring to FIG. 7, the method includes step S600 and step S620.

In step S600, inquiry information for inquiring a current usage mode is sent to a terminal device to which the application recommending information is to be sent to.

In step S610, identification information of the current usage mode sent from the terminal device is received after the terminal device receives the inquiry information and sends the identification information of the current usage mode.

In step S620, the current usage mode of the terminal device is determined based on the received identification information of the current usage mode.

Figure 8:
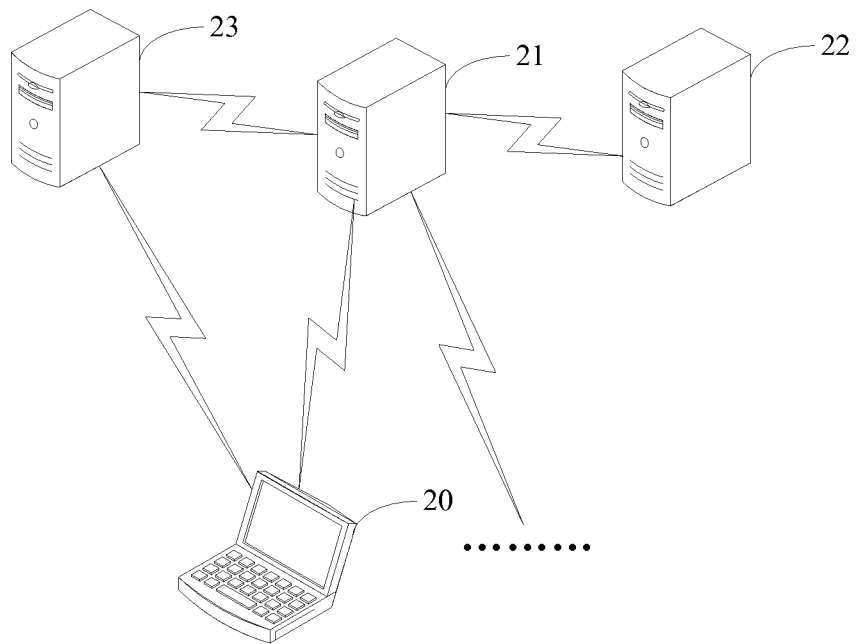
FIG. 8 is another structural diagram of a system for determining an application to be recommended according to an embodiment of the disclosure.

Optionally, in the embodiment of the disclosure, the application server may be an independent server which may determine the application to be recommended for each usage mode, obtain application information of the application to be recommended for each usage mode and send the application recommending information. Practically, the application server may be also server farms including a plurality of servers. The server farms include at least three servers, i.e., a first server, a second server and a third server respectively. The first server is mainly configured to determine an application to be recommended for each usage mode. The second sever is mainly configured to store application information of each application (the application information includes a download address of the application, a publisher of the application, a comment for the application and so on). After the first server determines the application to be recommended for each usage mode, the second server may obtain application information of the application to be recommended for each usage mode. The third sever is mainly configured to send the application recommending information, receive the application information of the application to be recommended for each usage mode obtained by the first server and send to the terminal device to which the application recommending information is to be sent to application recommending information corresponding to the current usage mode of the terminal device. FIG. 8 illustrates another structural diagram of a system for determining an application to be recommended according to an embodiment of the disclosure. Referring to FIG. 8, the system includes a plurality of terminal devices 20, a first server 21, a second server 22 and a third server 23.

Each terminal device 20 detects its usage mode and an application run in the usage mode, and sends mode identification information of the usage mode and application identification information of the application to the first server 21.

The first server 21 may obtain the mode identification information of the usage mode and the application identification information of the application run in the usage mode which are sent from each of the plurality of terminal devices 20; gather the mode identification information and application identification information sent from the plurality of terminal devices 20; and determine an application meeting a predetermined condition for each usage mode based on the gathered mode identification information and application identification information, where the application meeting the predetermined condition for each usage mode is an application to be recommended for each usage mode.

The second server 22 stores application information of each application. After the first server 21 determines the application to be recommended for each usage mode, the second server 22 may receive a request for requesting application information of the application to be recommended for each usage mode from the first server 21, and send the application information of the application to be recommended for each usage mode to the first server 21.

The third server 23 may receive the application information of the application to be recommended for each usage mode sent from the first server 21 after the first server 21 obtains the application information of the application to be recommended for each usage mode, determine a current usage mode of a terminal device to which the application recommending information is to be sent to, and send the application recommending information corresponding to the current usage mode to the terminal device.

In the system for determining an application to be recommended provided by the embodiment of the disclosure, each terminal device may send mode identification information of its usage mode and application identification information of the application run in the usage mode to the server, so that the server may determine the application to be recommended for each usage mode based on the gathered mode identification information and application identification information sent from the terminal devices, hence the application to be recommended for each usage mode is determined accurately.

Hereinafter the method for determining an application to be recommended will be described from a perspective of a terminal device, and the method for determining an application to be recommended described below may correspond to the method for determining an application to be recommended described above from the perspective of the server, and the methods may refer to each other.

Figure 9:
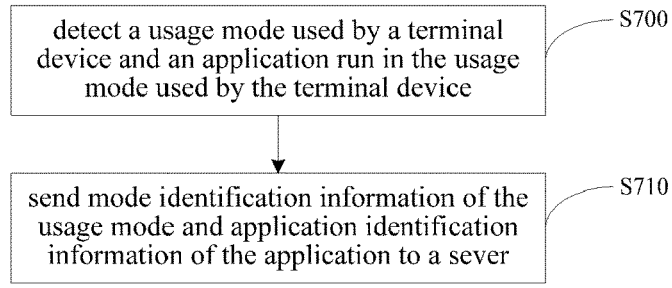
FIG. 9 is a sixth flowchart of a method for determining an application to be recommended according to an embodiment of the disclosure.

FIG. 9 is a sixth flowchart of a method for determining an application to be recommended according to an embodiment of the disclosure. Referring to FIG. 9, the method includes step S700 to step S710.

In step S700, a usage mode used by a terminal device and an application run in the usage mode used by the terminal device are detected.

In step S710, mode identification information of the usage mode and application identification information of the application are sent to a sever, so that the server obtains the mode identification information and application identification information sent from the terminal device, gathers mode identification information and application identification information sent from terminal devices, and determines an application meeting a predetermined condition for each usage mode based on the gathered mode identification information and application identification information, where the application meeting the predetermined condition for each usage mode is an application to be recommended for each usage mode.

Optionally, the implementations for the server to obtain the mode identification information and application identification information sent from the terminal device, gather mode identification information and application identification information sent from terminal devices, and determine an application meeting a predetermined condition for each usage mode based on the gathered mode identification information and application identification information may refer to the corresponding description above.

Figure 10:
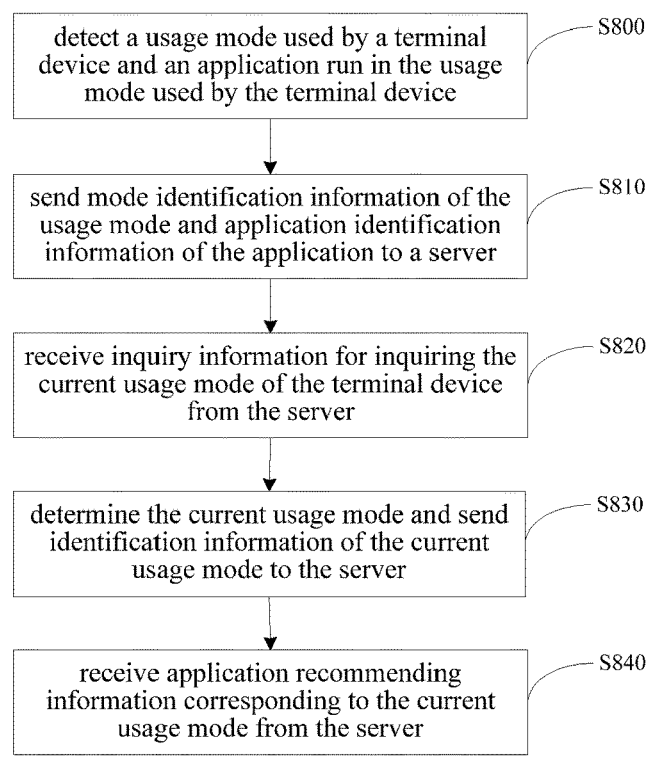
FIG. 10 is a seventh flowchart of a method for determining an application to be recommended according to an embodiment of the disclosure.

Optionally, the server may send to the terminal device application recommending information corresponding to the current usage mode of the terminal device after the server determines the application to be recommended for each usage mode, obtains application information of the application to be recommended for each usage mode and generates the application recommending information including the application information for each usage mode. FIG. 10 illustrates a seventh flowchart of a method for determining an application to be recommended according to an embodiment of the disclosure. Referring to FIG. 10, the method includes step S800 to step S840.

In step S800, a usage mode used by a terminal device and an application run in the usage mode used by the terminal device are detected.

In step S810, mode identification information of the usage mode and application identification information of the application are sent to a server, so that the server obtains the mode identification information and application identification information sent from the terminal device, gathers mode identification information and application identification information sent from terminal devices, and determines an application meeting a predetermined condition for each usage mode based on the gathered mode identification information and application identification information, where the application meeting the predetermined condition for each usage mode is an application to be recommended for the usage mode.

In step S820, inquiry information for inquiring the current usage mode of the terminal device sent from the server is received after the server determines the application to be recommended for each usage mode, obtains application information of the application to be recommended for each usage mode and generates application recommending information including the application information for each usage mode.

In step S830, the current usage mode is determined, and identification information of the current usage mode is sent to the server.

In step S840, application recommending information corresponding to the current usage mode sent from the server is received after the server receives identification information of the current usage mode and determines the current usage mode of the terminal device.

In the method for determining an application to be recommended provided by the embodiment of the disclosure, each terminal device may send mode identification information of the its usage mode and application identification information of an application run in the usage mode to the server, so that the server determines an application to be recommended for each usage mode based on the gathered mode identification information and application identification information sent from the terminal devices, hence the application to be recommended for each usage mode is determined accurately.

Hereinafter an apparatus for determining an application to be recommended will be described from a perspective a server. The content described below may correspond to the method for determining an application to be recommended described above from the perspective of the server, and the apparatus and the method may refer to each other.

Figure 11:
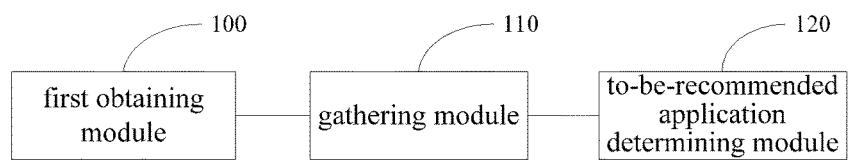
FIG. 11 is a structural diagram of an apparatus for determining an application to be recommended according to an embodiment of the disclosure.

FIG. 11 is a structural diagram of an apparatus for determining an application to be recommended according to an embodiment of the disclosure. Referring to FIG. 11, the apparatus includes a first obtaining module 100, a gathering module 110 and a to-be-recommended application determining module 120.

The first obtaining module 100 is configured to obtain mode identification information of a usage mode used by each of a plurality of terminal devices and application identification information of an application run in the usage mode used by each of the plurality of terminal devices which are sent from each of the plurality of terminal devices.

The gathering module 110 is configured to gather the mode identification information and the application identification information sent from the plurality of terminal devices.

The to-be-recommended application determining module 120 is configured to determine an application meeting a predetermined condition for each usage mode based on the gathered mode identification information and application identification information, where the application meeting the predetermined condition for each usage mode is an application to be recommended for each usage mode.

Figure 12:
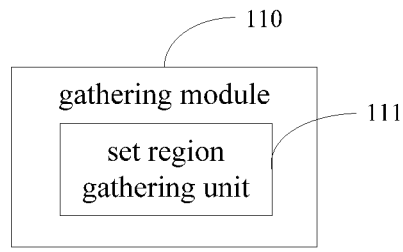
FIG. 12 is a structural diagram of a gathering module according to an embodiment of the disclosure.

Optionally, FIG. 12 illustrates an optional structure of the gathering module 110 according to an embodiment of the disclosure. Referring to FIG. 12, the gathering module 110 includes a set region gathering unit 111.

The set region gathering unit 111 is configured to determine the mode identification information and the application identification information sent from the terminal device located in a set region.

Figure 13:
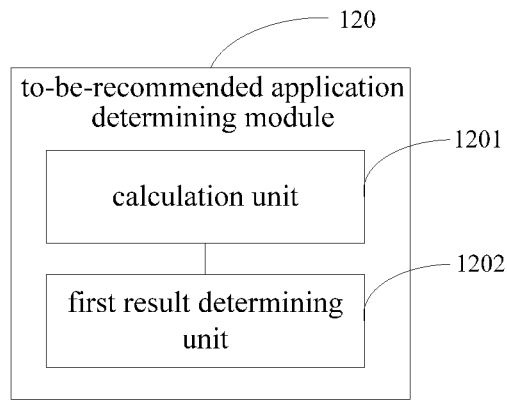
FIG. 13 is a structural diagram of a to-be-recommended application determining module according to an embodiment of the disclosure.

Correspondingly, FIG. 13 illustrates an optional structure of the to-be-recommended application determining module 120 according to an embodiment of the disclosure. Referring to FIG. 13, the to-be-recommended application determining module 120 includes a calculation unit 1201 and a first result determining unit 1202.

The calculation unit 1201 is configured to calculate using times of each application used by the terminal device located in the set region under each usage mode based on the determined mode identification information and application identification information sent from the terminal device located in the set region.

The first result determining unit 1202 is configured to determine applications used by the terminal device located in the set region and ranked in a descending order of the using times for each usage mode, based on the calculated using times of each application used by the terminal device located in the set region under each usage mode.

Figure 14:
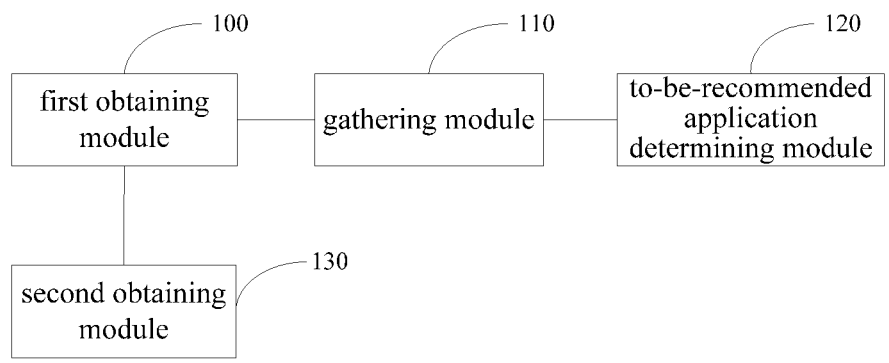
FIG. 14 is another structural diagram of an apparatus for determining an application to be recommended according to an embodiment of the disclosure.

Optionally, FIG. 14 illustrates another structure diagram of the apparatus for determining an application to be recommended according to an embodiment of the disclosure. In conjunction with FIG. 11 and FIG. 14, the apparatus further includes a second obtaining module 130.

The second obtaining module 130 is configured to obtain, from each of the plurality of terminal devices, region identification information of a region where each of the plurality of terminal devices is located.

Figure 15:
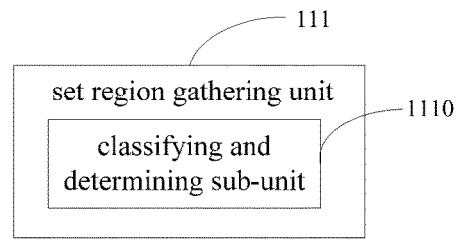
FIG. 15 is a structural diagram of a set region gathering unit according to an embodiment of the disclosure.

Correspondingly, FIG. 15 illustrates an optional structure of the set region gathering unit 111 according to an embodiment of the disclosure. Referring to FIG. 15, the set region gathering unit 111 includes a classifying and determining sub-unit 1110.

The classifying and determining sub-unit 1110 is configured to classify the application identification information and determining mode identification information and application identification information corresponding to set region identification information based on the region identification information and the mode identification information, where the set region identification information corresponds to the set region.

Figure 16:
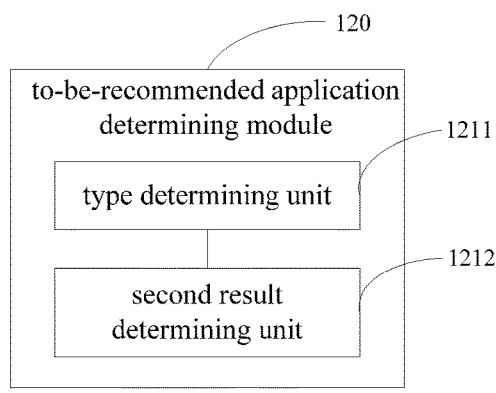
FIG. 16 is a structural diagram of a to-be-recommended application determining module according to an embodiment of the disclosure.

Optionally, FIG. 16 illustrates another optional structure of the to-be-recommended application determining module 120 according to an embodiment of the disclosure. Referring to FIG. 16, the to-be-recommended application determining module 120 includes a type determining unit 1211 and a second result determining unit 1212.

The type determining unit 1211 is configured to determine a type of an application with a maximum using times used by a first terminal device for each usage mode, where one usage mode corresponds to one determined type.

The second result determining unit 1212 is configured to determine an application of the determined type for each usage mode based on the gathered mode identification information and application identification information, where the application of the determined type for each usage mode is the application to be recommended for each usage mode.

Figure 17:
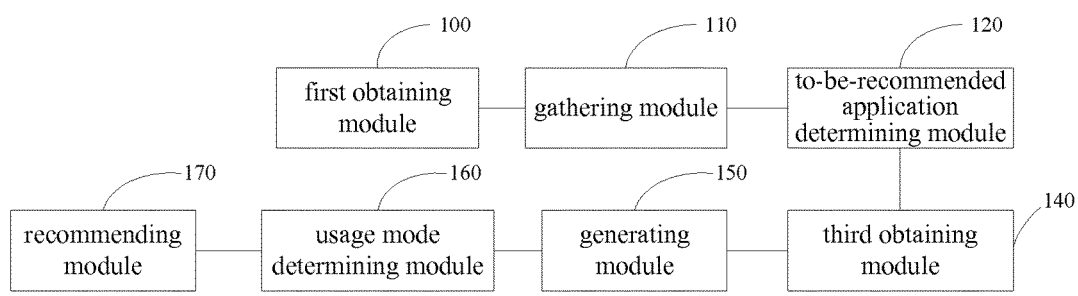
FIG. 17 is another structural diagram of an apparatus for determining an application to be recommended according to an embodiment of the disclosure.

Optionally, FIG. 17 illustrates another structure of the apparatus for determining an application to be recommended according to an embodiment of the disclosure. In conjunction with FIG. 11 and FIG. 17, the apparatus further includes a third obtaining module 140, a generating module 150, a usage mode determining module 160 and a recommending module 170.

The third obtaining module 140 is configured to obtain application information of the application to be recommended for each usage mode.

The generating module 150 is configured to generate application recommending information including the corresponding application information for each usage mode.

The usage mode determining module 160 is configured to determine a current usage mode of a terminal device to which the application recommending information is to be sent to.

The recommending module 170 is configured to send the application recommending information corresponding to the current usage mode to the terminal device.

Figure 18:
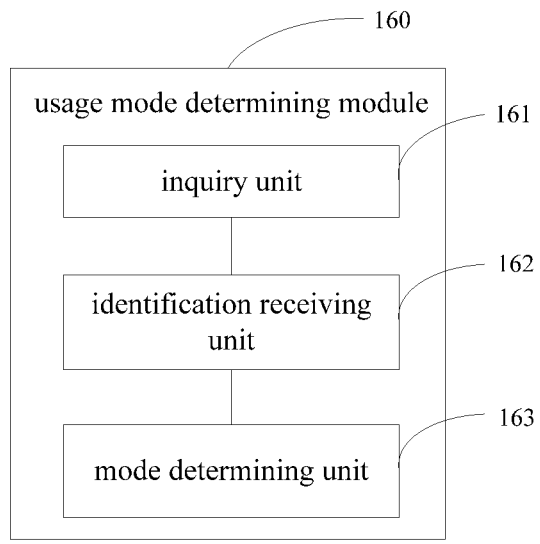
FIG. 18 is a structural diagram of a usage mode determining module according to an embodiment of the disclosure.

Optionally, FIG. 18 illustrates an optional structure of the usage mode determining module 160 according to an embodiment of the disclosure. Referring to FIG. 18, the usage mode determining module 160 includes an inquiry unit 161, an identification receiving unit 162 and a mode determining unit 163.

The inquiry unit 161 is configured to send inquiry information for inquiring the current usage mode to the terminal device to which the application recommending information is to be sent to.

The identification receiving unit 162 is configured to receive identification information of the current usage mode sent from the terminal device after the terminal device receives the inquiry information and sends the identification information of the current usage mode.

The mode determining unit 163 is configured to determine the current usage mode of the terminal device based on the received identification information of the current usage mode.

In the apparatus for determining an application to be recommended provided by the embodiment of the disclosure, each terminal device may send the mode identification information of its usage mode and application identification information of an application run in the usage mode to a server, so that the server determines an application to be recommended for each usage mode based on the gathered mode identification information and corresponding application identification information sent from the terminal devices, hence the application to be recommended for each usage mode is determined accurately.

A server is further provided according to an embodiment of the disclosure, which includes the apparatus for determining an application to be recommended described above. The apparatus for determining an application to be recommended in the server may refer to the corresponding description above, which is not described herein.

An apparatus for determining an application to be recommended will be described from a perspective of a terminal device hereinafter. The apparatus for determining an application to be recommended described below may correspond to the method for determining an application to be recommended described above from the perspective of the terminal device, and the apparatus and the method may refer to each other.

Figure 19:
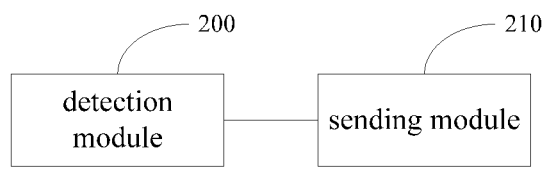
FIG. 19 is another structural diagram of an apparatus for determining an application to be recommended according to an embodiment of the disclosure.

FIG. 19 is another structural diagram of an apparatus for determining an application to be recommended according to an embodiment of the disclosure. Referring to FIG. 19, the apparatus includes a detection module 200 and a sending module 210.

The detection module 200 is configured to detect a usage mode used by a terminal device and an application run in the usage mode used by the terminal device.

The sending module 210 is configured to send mode identification information of the usage mode and application identification information of the application to a server, so that the server obtains the mode identification information and the application identification information sent from the terminal device, gathers the mode identification information and the application identification information sent from a plurality of terminal devices and determines an application meeting a predetermined condition for each usage mode based on the gathered mode identification information and application identification information, where the application meeting the predetermined condition for each usage mode is an application to be recommended for each usage mode.

Figure 20:
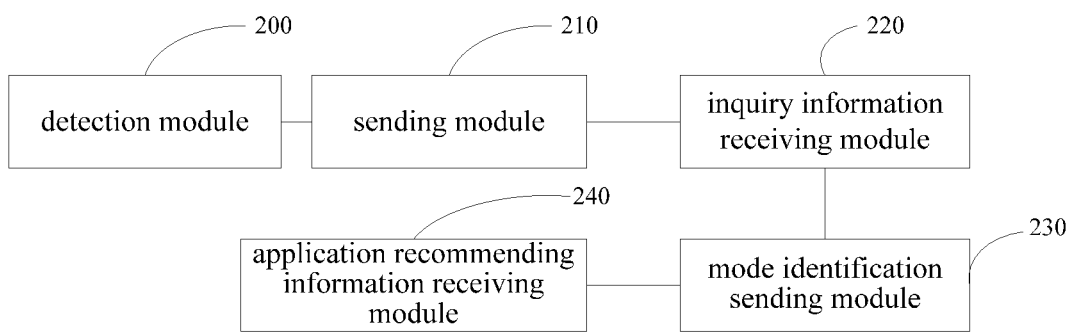
FIG. 20 is another structural diagram of an apparatus for determining an application to be recommended according to an embodiment of the disclosure.

Optionally, FIG. 20 illustrates another structural diagram of the apparatus for determining an application to be recommended according to an embodiment of the disclosure. In conjunction with FIG. 19 and FIG. 20, the apparatus further includes an inquiry information receiving module 220, a mode identification sending module 230 and an application recommending information receiving module 240.

The inquiry information receiving module 220 is configured to receive inquiry information for inquiring a current usage mode of the terminal device sent from the server after the server determines the application to be recommended for each usage mode, obtains application information of the application to be recommend in each usage mode and generates application recommending information including the obtained application information for each usage mode.

The mode identification sending module 230 is configured to determine the current usage mode and sending identification information of the current usage mode to the server.

The application recommending information receiving module 240 is configured to receive application recommending information corresponding to the current usage mode transmitted from the server, after the server receives identification information of the current usage mode and determines the current usage mode of the terminal device.

According to the embodiment of the disclosure, the application to be recommended for each usage mode can be determined accurately.

A terminal device is further provided according to an embodiment of the disclosure, which includes the apparatus for determining an application to be recommended described above.

Figure 21:
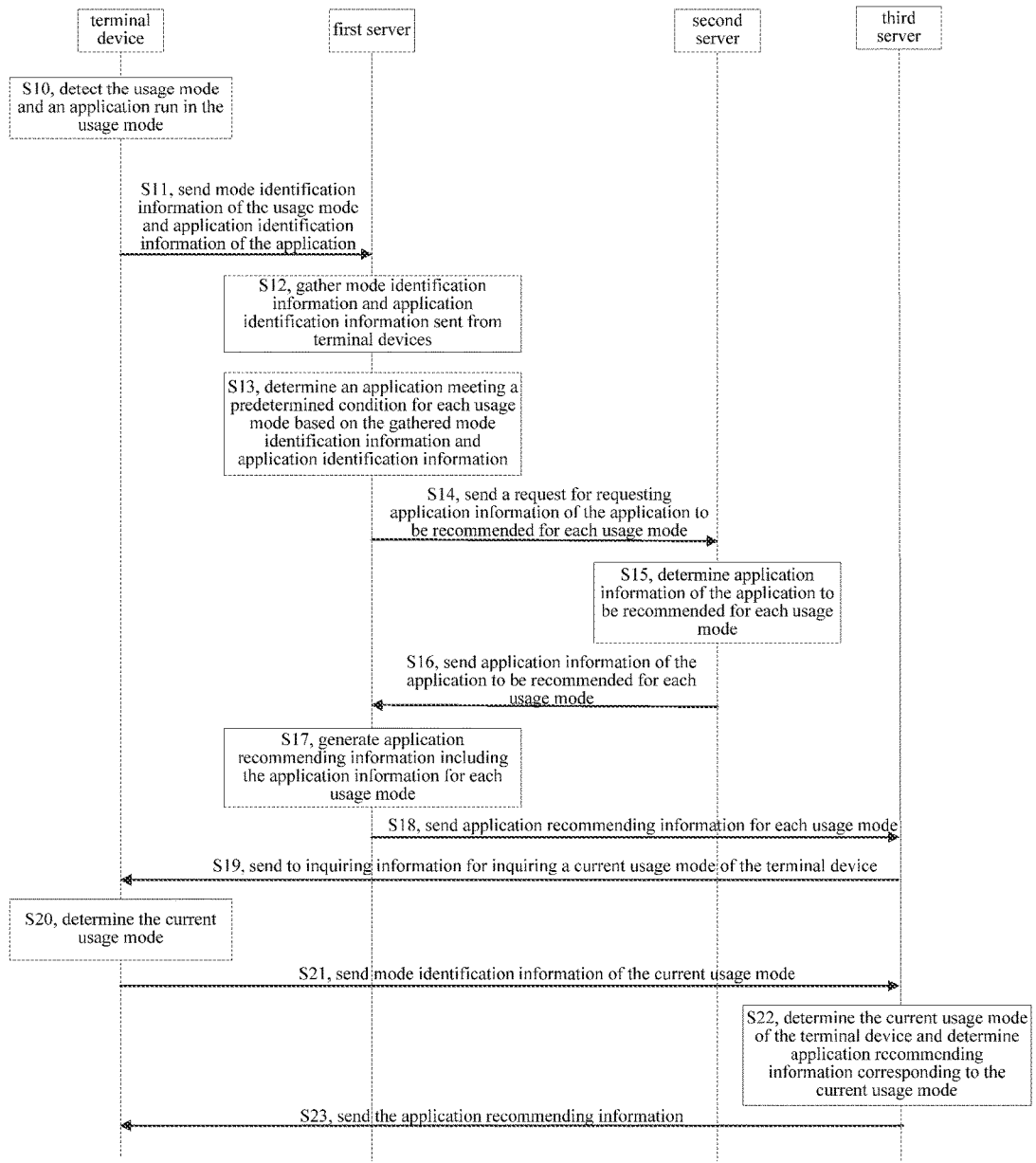
FIG. 21 is a signaling flowchart of a method for determining an application to be recommended according to an embodiment of the disclosure.

A preferred embodiment of the disclosure is described hereinafter. FIG. 21 is a signaling flowchart of a method for determining an application to be recommended according to an embodiment of the disclosure. Devices related to the method include a plurality of terminal devices, a first server, a second server and a third server. FIG. 21 illustrates only the signaling interaction between one terminal device and the first server and the signal interaction between the one terminal device and the third server, and for other terminal devices, the signaling interactions are similar. Referring to FIG. 21, the signaling flow includes step S10 to step S23.

In step S10, each terminal device detects its usage mode and an application run in the usage mode.

In step S11, each terminal device sends mode identification information of the usage mode and application identification information of the application to the first server.

In step S12, the first server gathers mode identification information and application identification information sent from terminal devices.

In step S13, the first server determines an application meeting a predetermined condition for each usage mode based on the gathered mode identification information and application identification information; and the application meeting the predetermined condition for each usage mode is an application to be recommended for each usage mode.

In step S14, the first server sends to the second server a request for requesting application information of the application to be recommended for each usage mode.

In step S15, the second server determines the application information of the application to be recommended for each usage mode requested by the first server.

In step S16, the second server sends to the first server the application information of the application to be recommended for each usage mode.

In step S17, the first server generates application recommending information including the requested application information for each usage mode.

In step S18, the first server sends to the third server the application recommending information for each usage mode.

In step S19, the third server sends to a terminal device inquiring information for inquiring a current usage mode of the terminal device.

In step S20, the terminal device determines its current usage mode.

In step S21, the terminal device sends mode identification information of the current usage mode to the third server.

In step S22, the third server determines the current usage mode of the terminal device based on the received mode identification information of the current usage mode and determines application recommending information corresponding to the current usage mode.

In step S23, the third server sends the application recommending information to the terminal device.

In addition, based on the method and apparatus for determining an application to be recommended, the operation parameter of the terminal device may be further adjusted after the application used by the terminal device is detected, to make the adjusted operation parameter be matched with the software usage scenario of the terminal device.

Figure 22:
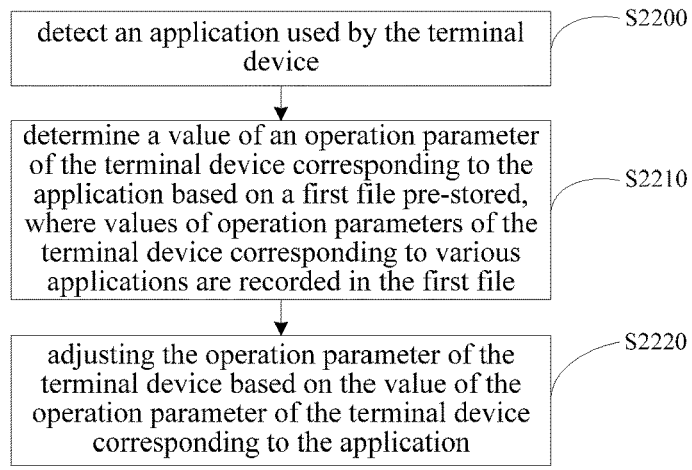
FIG. 22 is a flowchart of a method for adjusting an operation parameter of a terminal device according to an embodiment of the disclosure.

FIG. 22 is a flowchart of a method for adjusting an operation parameter of a terminal device according to an embodiment of the disclosure. The method is applicable to a terminal device which may be an intelligent terminal device such as a smartphone, a tablet computer and a laptop computer. Referring to FIG. 22, the method includes steps S2200 to S2220.

In step S2200, an application used by the terminal device is detected. This step may be included in step S700 of the method for determining an application to be recommended described above.

Optionally, in the embodiment of the disclosure, when an application is triggered to run, the triggered application may be determined as the application used by the terminal device, and the application is run in the foreground of the terminal device after being triggered.

Optionally, in the embodiment of the disclosure, when an application is triggered to run, identification information of the application may be determined. The identification information can uniquely identify the application, such as a package name of the application and a name of the application.

In step S2210, a value of an operation parameter of the terminal device corresponding to the application is determined based on a first file pre-stored, where values of operation parameters of the terminal device corresponding to various applications are recorded in the first file.

A first file recording values of operation parameters of the terminal device corresponding to various applications may be stored in the terminal device. For example, correspondence between the identification information of the applications and the values of the operation parameters of the terminal device may be recorded in the first file. In the embodiment of the disclosure, once the application used by the terminal device is detected and the identification information of the application is determined, the value of the operation parameter of the terminal device corresponding to the identification information of the application may be determined based on the correspondence between the identification information of the applications and the values of the operation parameters of the terminal device.

In step S2220, the operation parameter of the terminal device is adjusted based on the value of the operation parameter of the terminal device corresponding to the application.

The terminal device operates based on the adjusted operation parameter, so that the operational state of the terminal device is matched with the used application.

In the method for adjusting the operation parameter of the terminal device according to the embodiment of the disclosure, an application used by the terminal device is detected, a value of an operation parameter of the terminal device corresponding to the application is determined based on a pre-stored first file recording values of operation parameters of the terminal device corresponding to various applications, and the operation parameter of the terminal device is adjusted based on the determined value of the operation parameter of the terminal device. The value of the operation parameter of the terminal device corresponding to the used application is determined based on the first file recording values of operation parameters of the terminal device corresponding to various applications, and thus the operation parameter of the terminal device can be adjusted to be matched with the used application. Therefore, the adjusted operation parameter is matched with the software usage scenario of the terminal device, and unstandard operational energy consumption of software and poor operational smoothness are avoided.

Optionally, the operation parameter of the terminal device may include audio parameter of a sound card and brightness parameter of a screen. For convenience of description, an example of the method for adjusting the operation parameter of the terminal device according to the embodiment of the disclosure is described by taking the case that the operation parameter of the terminal device is the audio parameter of the sound card as an example.

Different volume levels are required for different applications. For example, low volume level is required for a document editing application (such as Word application), and high volume level is required for a music application (such as a video application) to ensure the user hears the played content. Therefore, in the embodiment of the disclosure, the document editing application may correspond to a first audio parameter value (corresponding to a low volume level) and the music application may correspond to a second audio parameter value (corresponding to a high volume level), and the correspondence between the identification information of the document editing application and the first audio parameter value and the correspondence between the identification information of the music application and the second audio parameter value are pre-stored in the first file. If it is determined that the application used by the terminal device is the music application (for example, the music application is triggered to run), the identification information of the music application is acquired, the second audio parameter value corresponding to the identification information of the music application is determined from the first file, and the audio parameter of the terminal device is adjusted to have the second audio parameter value, so that the music played by the terminal device has a high volume level, and a better music experience for the user is ensured.

Similarly, if it is determined that the application used by the terminal device is the document editing application, the identification information of the document editing application is acquired, the first audio parameter value corresponding to the identification information of the document editing application is determined from the first file, and the audio parameter of the terminal device is adjusted to have the first audio parameter value, so that the music played by the terminal device has a low volume level and the power consumption of the terminal device is low.

Optionally, in the embodiment of the disclosure, in a case that applications corresponding to different operation parameter values of the terminal device run on the terminal device simultaneously, the application having a higher requirement on the operation parameter of the terminal device is ensured preferably. For example, the music application and the document editing application run on the terminal device simultaneously, the second audio parameter value may be used as the value of the operation parameter of the terminal device to ensure the music application having a higher requirement on the operation parameter of the terminal device.

Optionally, the values of the operation parameters of the terminal device corresponding to various applications recorded in the first file may be defined by the user. Optionally, the values of the operation parameters of the terminal device corresponding to various applications recorded in the first file may be standard values of the operation parameters of the terminal device corresponding to various applications which are set by a service provider. The standard values of the operation parameters of the terminal device corresponding to various applications provided by the service provider may be updated periodically, and the first file pre-stored in the terminal device may be updated correspondingly based on the updated content provided by the service provider to ensure the standard of the values of the operation parameters of the terminal device corresponding to various applications which are recorded in the first file pre-stored in the terminal device.

Figure 23:
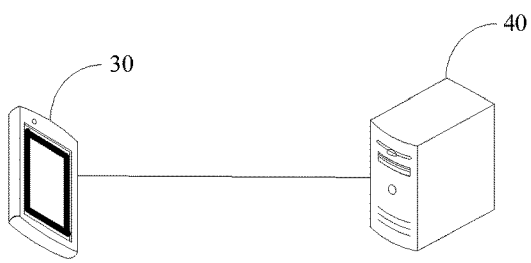
FIG. 23 is a structural diagram of a system for adjusting an operation parameter of a terminal device according to an embodiment of the disclosure.

A server may be provided for the service provider, and a second file is stored in the server. Values of operation parameters of the terminal device corresponding to various applications are recorded in the second file. The service provider may update content of the second file in which values of operation parameters of the terminal device corresponding to various applications are recorded. The first file pre-stored in the terminal device is determined based on the second file. Optionally, FIG. 23 illustrates a structural diagram of a system for adjusting an operation parameter of a terminal device according to an embodiment of the disclosure. The system may be used to implement the method for adjusting the operation parameter of the terminal device according to the embodiment of the disclosure. Referring to FIG. 23, the system includes a terminal device 30 and a server 40. A second file is stored in the server 40, and values of operation parameters of the terminal device corresponding to various applications are recorded in the second file. The content in the first file pre-stored in the terminal device 30 is determined based on the second file.

Specifically, the terminal device 30 may request the second file stored in the server 40 from the server 40, determine the first file based on the second file, and then store the first file. The terminal device 30 may detect the used application, determine the value of the operation parameter of the terminal device corresponding to the used application based on the pre-stored first file, and then adjust the operation parameter of the terminal device based on the determined value of the operation parameter of the terminal device.

Optionally, the process of determining the first file pre-stored in the terminal device based on the second file stored in the server may include: directly taking the second file as the first file.

Optionally, the process of taking the second file as the first file may include: in a case that the first file is not pre-stored in the terminal device, receiving the second file sent by the server and taking the second file as the first file; or in a case that the first file is pre-stored in the terminal device and the pre-stored first file is different from the second file, receiving the second file sent by the server and taking the second file as the first file (for example, replacing the pre-stored first file with the second file). The value of the operation parameter of the terminal device corresponding to the application used by the terminal device is determined based on the first file.

Optionally, the terminal device 30 may be the terminal device 10 in the above embodiments, and the server 40 may be the server 11 in the above embodiments.

Figure 24:
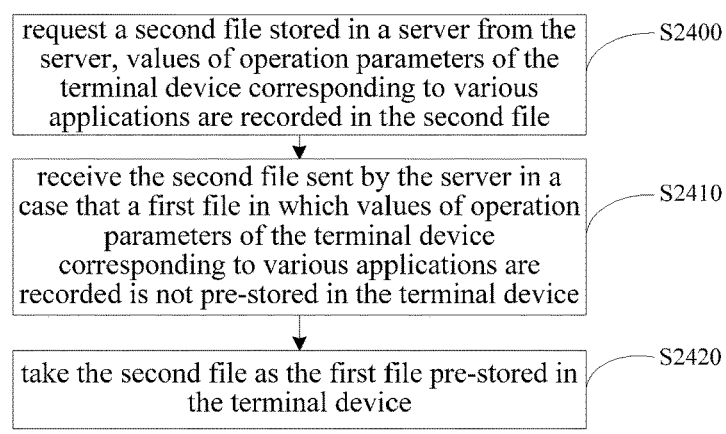
FIG. 24 is a flowchart of a method for determining a first file according to an embodiment of the disclosure.

FIG. 24 illustrates a flowchart of a method for determining a first file according to an embodiment of the disclosure. Referring to FIG. 24, the method includes steps S2400 to S2420.

In step S2400, a request requesting a second file is sent to a server in which the second file is stored. Values of operation parameters of the terminal device corresponding to various applications are recorded in the second file.

In step S2410, the second file sent by the server is received in a case that a first file in which values of operation parameters of the terminal device corresponding to various applications are recorded is not pre-stored in the terminal device.

In step S2420, the second file is taken as the first file pre-stored in the terminal device.

Figure 25:
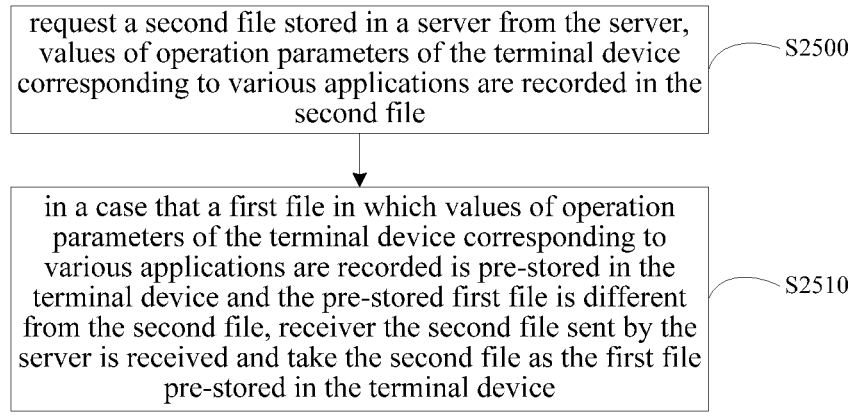
FIG. 25 is another flowchart of a method for determining a first file according to an embodiment of the disclosure.

Optionally, FIG. 25 illustrates another flowchart of a method for determining a first file according to an embodiment of the disclosure. Referring to FIG. 25, the method includes steps S2500 to S2510.

In step S2500, a request requesting a second file is sent to a server in which the second file is stored. Values of operation parameters of the terminal device corresponding to various applications are recorded in the second file.

In step S2510, in a case that a first file in which values of operation parameters of the terminal device corresponding to various applications are recorded is pre-stored in the terminal device and the pre-stored first file is different from the second file, the second file sent by the server is received and the second file is taken as the first file pre-stored in the terminal device.

After the second file is taken as the first file pre-stored in the terminal device, the terminal device may determine the value of the operation parameter of the terminal device corresponding to the application used by the terminal device based on the first file whose content is the same as that of the second file.

Optionally, the process of judging whether the pre-stored first file is different from the second file may include: setting version information for the first file pre-stored in the terminal device and the second file stored in the server, where the same version information corresponds to the same content about the values of the operation parameters of the terminal device corresponding to various applications; and determining the pre-stored first file is different from the second file in a case that the version information of the first file pre-stored in the terminal device is different from the version information of the second file stored in the server. Alternatively, the content of the pre-stored first file may be compared directly with the content of the second file, and then it is determined whether the content recorded in the pre-stored first file is the same as the content recorded in the second file based on the comparison result.

Optionally, the process of determining the first file pre-stored in the terminal device based on the second file stored in the server may include: in a case that the first file is pre-stored in the terminal device and the pre-stored first file is different from the second file, modifying the pre-stored first file based on different information of the second file from the pre-stored first file to make the modified first file is the same as the second file, and storing the modified first file. The value of the operation parameter of the terminal device corresponding to the application used by the terminal device is determined based on the modified first file.

Figure 26:
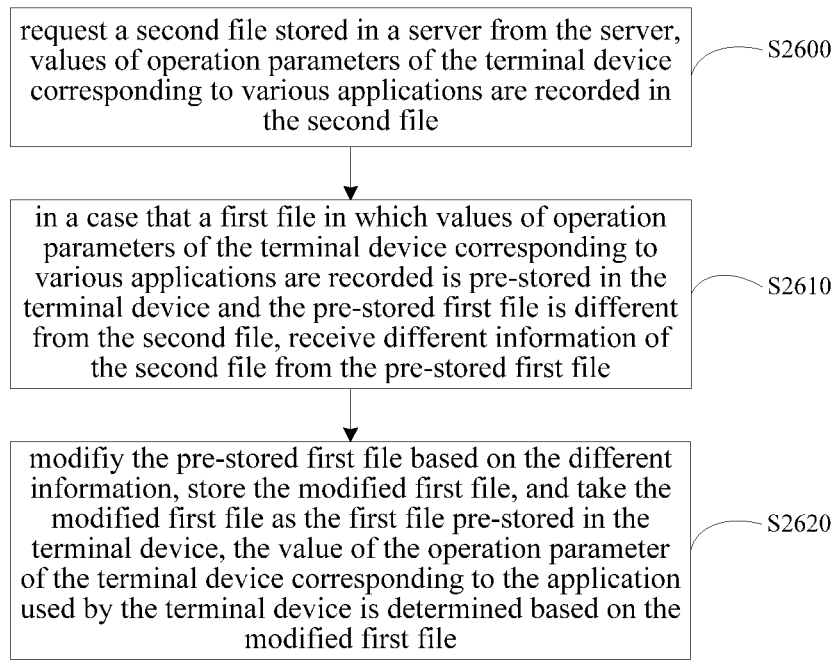
FIG. 26 is another flowchart of a method for determining a first file according to an embodiment of the disclosure.

FIG. 26 illustrates another flowchart of a method for determining a first file according to an embodiment of the disclosure. Referring to FIG. 26, the method includes steps S2600 to S2620.

In step S2600, a request requesting a second file is sent to a server in which the second file is stored, where values of operation parameters of the terminal device corresponding to various applications are recorded in the second file.

In step S2610, in a case that a first file in which values of operation parameters of the terminal device corresponding to various applications are recorded is pre-stored in the terminal device and the pre-stored first file is different from the second file, different information of the second file from the pre-stored first file is received.

Optionally, in the embodiment of the disclosure, it is determined whether the pre-stored first file is different from the second file based on the version information of the pre-stored first file and the second file, and the different information of the second file from the pre-stored first file is determined based on stored difference between the version information of the pre-stored first file and the version information of the second file in a case that the version information of the pre-stored first file is different from the version information of the second file. Specifically, the terminal device may upload the version information of the first file to the server, and the server compares the version information of the stored second file with the version information of the first file, and determines the different information of the second file from the first file based on the difference in the version information.

Optionally, in the embodiment of the disclosure, the different content information between the second files with different version information may be recorded in the server. For example, the different content information between the second file of version 1 and the second file of version 2 (the different content between the second file of version 1 in which values of operation parameters of the terminal device corresponding to various applications are recorded and the second file of version 2 in which values of operation parameters of the terminal device corresponding to the applications are recorded) may be recorded in the server. In a case that the version information of the first file pre-stored in the terminal device is version 1 and the version information of the second file stored in the server is version 2, the terminal device uploads the version information (version 1) of the pre-stored first file to the server, and the server determines the different content information between the second file of version 1 and the second file of version 2 based on the difference between version 1 and version 2, and sends the different content information to the terminal device.

In step S2620, the pre-stored first file is modified based on the different information, the modified first file is stored, and the modified first file is taken as the first file pre-stored in the terminal device in which values of operation parameters of the terminal device corresponding to various applications are recorded. The value of the operation parameter of the terminal device corresponding to the application used by the terminal device is determined based on the modified first file.

The first file is modified based on the different information of the second file from the first file, therefore, the content of the modified first file recording values of operation parameters of the terminal device corresponding to various applications is the same as the content of the second file stored in the server, and in this way, content of the first file recording values of operation parameters of the terminal device corresponding to various applications are updated.

Figure 27:
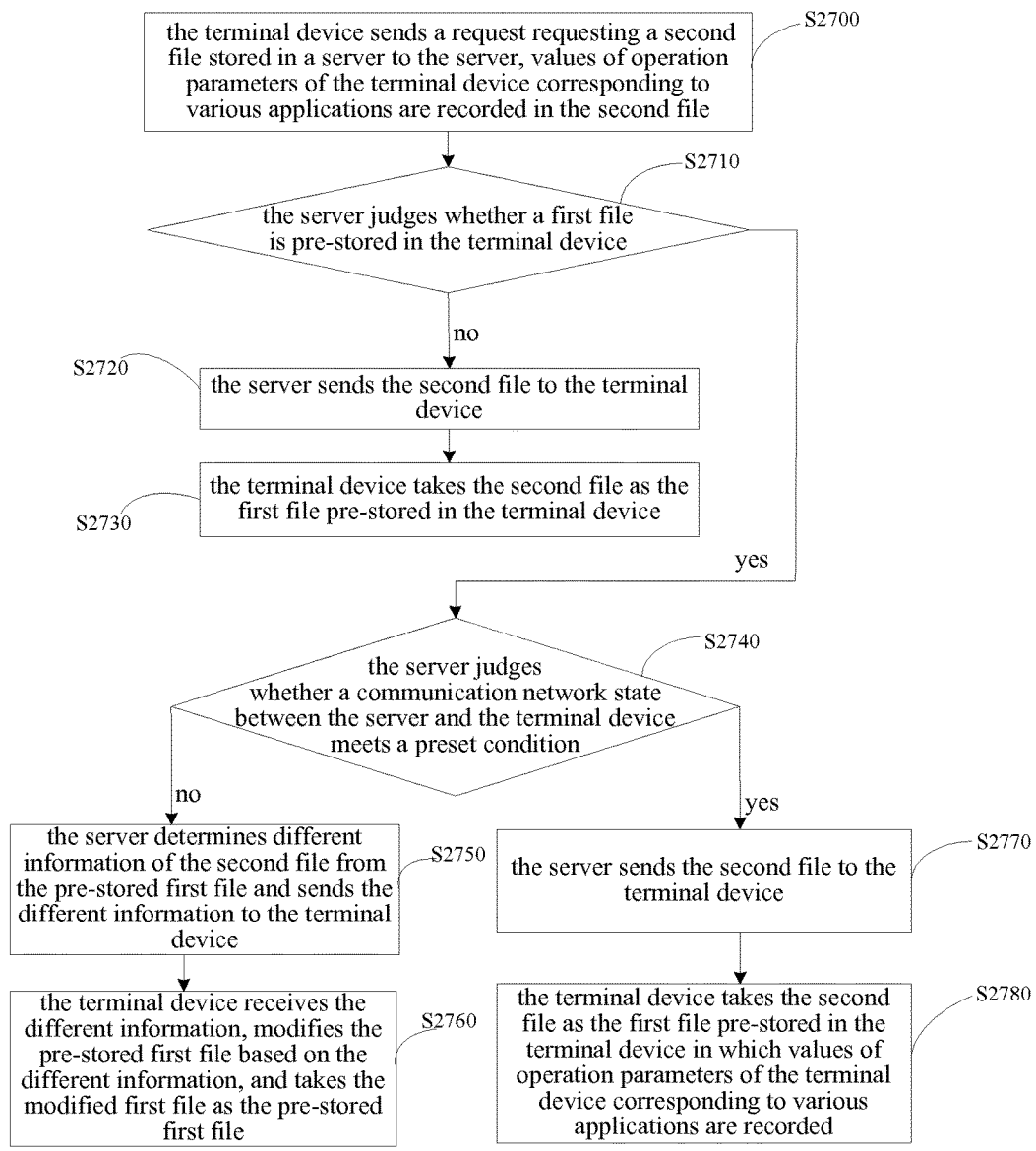
FIG. 27 is another flowchart of a method for determining a first file according to an embodiment of the disclosure.

Optionally, the methods for determining the first file as shown in FIG. 24 to FIG. 26 may be combined with each other. FIG. 27 illustrates another flowchart of a method for determining a first file according to an embodiment of the disclosure. Referring to FIG. 27, the method includes steps S2700 to S2780.

In step S2700, the terminal device sends a request requesting a second file to a server in which the second file is stored, where values of operation parameters of the terminal device corresponding to various applications are recorded in the second file.

In step S2710, the server judges whether a first file in which values of operation parameters of the terminal device corresponding to various applications are recorded is pre-stored in the terminal device. Step S2720 is performed in a case that the first file is not pre-stored in the terminal device, or step S2740 is performed in a case that the first file is pre-stored in the terminal device.

Optionally, the terminal device may carry in the request an identification indicating whether the first file is pre-stored in the terminal device, and the server can determine whether the first file is pre-stored in the terminal device based on the identification.

In step S2720, the server sends the second file to the terminal device.

In step S2730, the terminal device takes the second file as the first file pre-stored in the terminal device in which values of operation parameters of the terminal device corresponding to various applications are recorded.

In step S2740, the server judges whether a communication network state between the server and the terminal device meets a preset condition. Step S2750 is performed in a case that the communication network state between the server and the terminal device does not meet the preset condition, or step S2770 is performed in a case that the communication network state between the server and the terminal device meets the preset condition.

Optionally, the preset condition may include that the communication network state is smooth, the bandwidth of the communication channel is wide, smooth data transmission can be achieved between the server and the terminal device, and data transmission of large capability can be achieved.

In step S2750, the server determines different information of the second file from the pre-stored first file and sends the different information to the terminal device.

Optionally, in a case that the first file is pre-stored in the terminal device when the terminal device requests the second file, the terminal device may send version information of the pre-stored first file to the server, and the server may determine the different information between the pre-stored first file and the second file based on the version information of the pre-stored first file and the version information of the second file, and send the different information to the terminal device.

In step S2760, the terminal device receives the different information, modifies the pre-stored first file based on the different information, and takes the modified first file as the first file pre-stored in the terminal device in which values of operation parameters of the terminal device corresponding to various applications are recorded.

In step S2770, the server sends the second file to the terminal device.

In step S2780, the terminal device takes the second file as the first file pre-stored in the terminal device in which values of operation parameters of the terminal device corresponding to various applications are recorded.

Optionally, in a case that the first file is pre-stored in the terminal device, the server may select to send the different information between the pre-stored first file and the second file or send the second file based on the communication network state between the server and the terminal device, to determine the first file pre-stored in the terminal device in which values of operation parameters of the terminal device corresponding to various applications are recorded. Alternatively, in a case that the first file is pre-stored in the terminal device, the server may randomly select to send the different information between the pre-stored first file and the second file or send the second file, to determine the first file pre-stored in the terminal device in which values of operation parameters of the terminal device corresponding to various applications are recorded.

Figure 28:
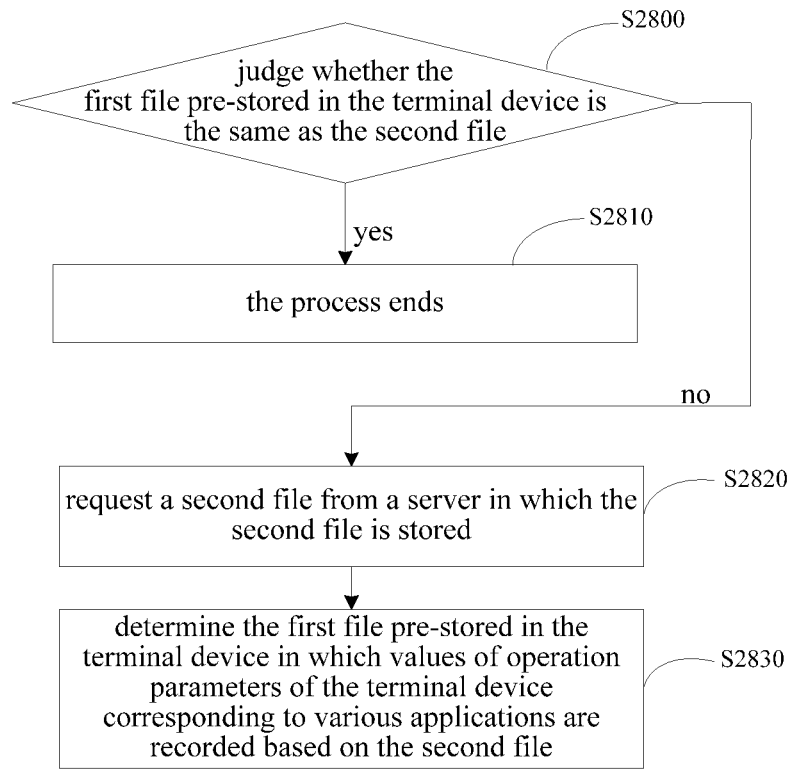
FIG. 28 is a flowchart of a method for requesting a second file from a server according to an embodiment of the disclosure.

Optionally, the terminal device may send a request requesting the version information of the second file to the server, and send a request requesting the second file to the server in a case that the version information of the second file is different from the version information of the first file pre-stored in the terminal device. FIG. 28 illustrates a flowchart of a method for requesting a second file from a server according to an embodiment of the disclosure. The method is applicable to the terminal device. Referring to FIG. 28, the method includes steps S2800 to S2830.

In step S2800, it is judged whether the first file pre-stored in the terminal device in which values of operation parameters of the terminal device corresponding to various applications are recorded is the same as the second file. Step S2810 is performed in a case that the first file is the same as the second file, or step S2820 is performed in a case that the first file is not the same as the second file.

Optionally, the terminal device may request the version information of the second file from the server, and determine that the first file is different from the second file in a case that the version information of the first file is different from the version information of the second file which is fed back from the server.

In step S2810, the process ends.

In step S2820, a request requesting the second file stored in the server is sent to the server.

In step S2830, the first file pre-stored in the terminal device in which values of operation parameters of the terminal device corresponding to various applications are recorded is determined based on the second file.

Optionally, the implementation of step S2830 may refer to the corresponding description above.

Figure 29:
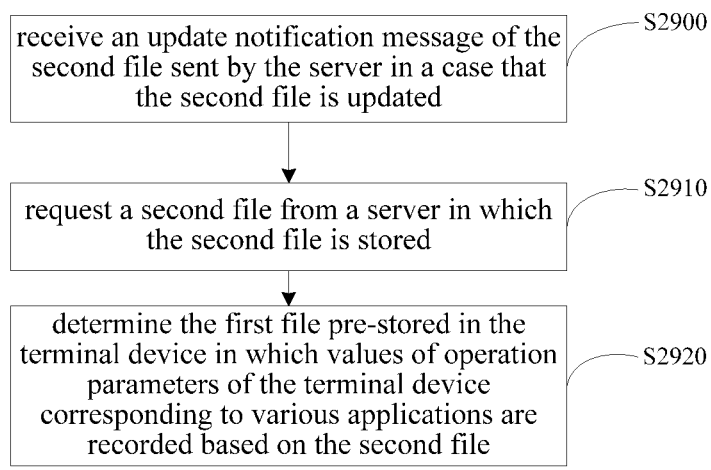
FIG. 29 is another flowchart of a method for requesting a second file from a server according to an embodiment of the disclosure.

Optionally, in the embodiment of the disclosure, the server may send an update notification message to the terminal device in a case that the second file in the server is updated, and accordingly the terminal device requests the second file from the server. FIG. 8 illustrates another flowchart of a method for requesting a second file from a server according to an embodiment of the disclosure. The method is applicable to the terminal device. Referring to FIG. 29, the method includes steps S2900 to S2920.

In step S2900, an update notification message of the second file sent by the server in a case that the second file is updated is received.

In step S2910, a request requesting the second file stored in the server is sent to the server.

In step S2920, the first file pre-stored in the terminal device in which values of operation parameters of the terminal device corresponding to various applications are recorded is determined based on the second file.

Optionally, the implementation of step S2920 may refer to the corresponding description above.

Optionally, recording values of operation parameters of the terminal device corresponding to various applications in the first file or the second file may include: classifying the applications according to types of the applications, determining values of operation parameters of the terminal device corresponding to each classification, and taking values of operation parameters of the terminal device corresponding to each classification as values of operation parameters of the terminal device corresponding to the applications in each classification. Optionally, in the embodiment of the disclosure, the applications may be classified into several classifications, such as classifications of video, photograph, e-book and music, and values of operation parameters of the terminal device (namely settings of the terminal device) are determined according to the characteristics of the applications in the classifications. For example, special sound effect is required for the music and video, and the display feature may be optimized for the photograph and e-book.

In the embodiment of the disclosure, the value of the operation parameter of the terminal device corresponding to the used application is determined based on the first file in which values of operation parameter of the terminal device corresponding to various applications are recorded, and thus the operation parameter of the terminal device can be adjusted to be matched with the used application. Therefore, the adjusted operation parameter is matched with the software usage scenario of the terminal device, and unstandard operational energy consumption of software and poor operational smoothness are avoided.

An apparatus for adjusting an operation parameter of a terminal device according to an embodiment of the disclosure is described hereinafter. The description of the apparatus for adjusting the operation parameter of the terminal device below corresponds to the description of the method for adjusting the operation parameter of the terminal device above, and the apparatus and the method may refer to each other.

Figure 30:
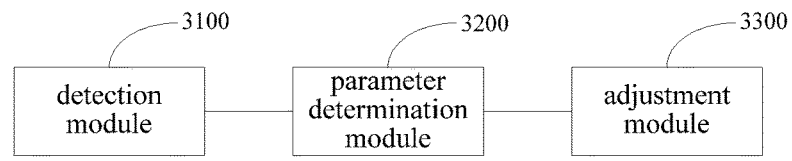
FIG. 30 is a structural diagram of an apparatus for adjusting an operation parameter of a terminal device according to an embodiment of the disclosure.

FIG. 30 is a structural diagram of an apparatus for adjusting an operation parameter of a terminal device according to an embodiment of the disclosure. Referring to FIG. 30, the apparatus for adjusting the operation parameter of the terminal device includes a detection module 3100, a parameter determination module 3200 and an adjustment module 3300.

The detection module 3100 is configured to detect an application used by the terminal device. The detection module 3100 may be the detection module 200 of the apparatus for determining an application to be recommended.

The parameter determination module 3200 is configured to determine a value of an operation parameter of the terminal device corresponding to the application based on a first file pre-stored, where values of operation parameters of the terminal device corresponding to various application are recorded in the first file.

The adjustment module 3300 is configured to adjust the operation parameter of the terminal device based on the value of the operation parameter of the terminal device corresponding to the application.

Figure 31:
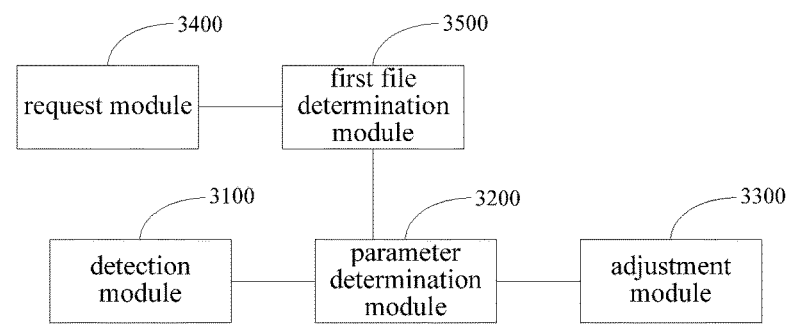
FIG. 31 is another structural diagram of an apparatus for adjusting an operation parameter of a terminal device according to an embodiment of the disclosure.

Optionally, FIG. 31 illustrates another structural diagram of the apparatus for adjusting the operation parameter of the terminal device according to an embodiment of the disclosure. In conjunction with FIG. 30 and FIG. 31, the apparatus for adjusting the operation parameter of the terminal device further includes a request module 3400 and a first file determination module 3500.

The request module 3400 is configured to request a second file from a server, where values of operation parameters of the terminal device corresponding to various application are recorded in the second file.

The first file determination module 3500 is configured to determine the first file based on the second file.

Figure 32:
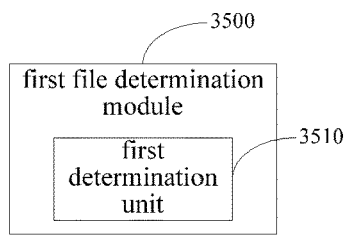
FIG. 32 is a structural diagram of a first file determination module according to an embodiment of the disclosure.

Optionally, FIG. 32 illustrates a structure of the first file determination module 500 according to an embodiment of the disclosure. Referring to FIG. 32, the first file determination module 3500 includes a first determination unit 3510.

The first determination unit 3510 is configured to receive the second file sent by the server, and take the second file as the first file pre-stored in the terminal device in which values of operation parameters of the terminal device corresponding to various applications are recorded.

Figure 33:
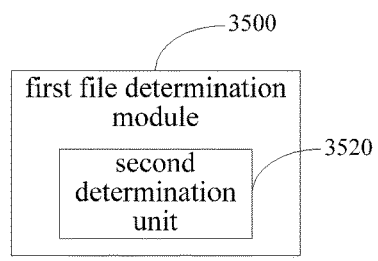
FIG. 33 is another structural block diagram of a first file determination module according to an embodiment of the disclosure.

Optionally, FIG. 33 illustrates another structure of the first file determination module 3500 according to an embodiment of the disclosure. Referring to FIG. 33, the first file determination module 3500 includes a second determination unit 3520.

The second determination unit 3520 is configured to, in a case that the first file in which values of operation parameters of the terminal device corresponding to various applications are recorded is pre-stored in the terminal device and the pre-stored first file is different from the second file, receive different information of the second file sent by the server from the pre-stored first file, modify the pre-stored first file based on the different information, and store the modified first file, where the value of the operation parameter of the terminal device corresponding to the application is determined based on the modified first file.

Figure 34:
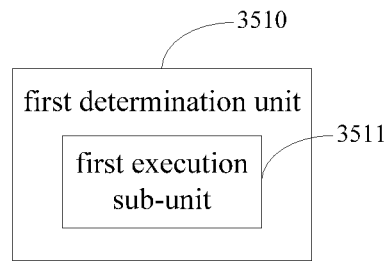
FIG. 34 is a structural diagram of a first determination unit according to an embodiment of the disclosure.

Optionally, FIG. 34 illustrates a structure of the first determination unit 3510 according to an embodiment of the disclosure. Referring to FIG. 34, the first determination unit 3510 includes a first execution sub-unit 3511.

The first execution sub-unit 3511 is configured to, in a case that the first file in which values of operation parameters of the terminal device corresponding to various applications are recorded is pre-stored in the terminal device and the pre-stored first file is different from the second file, receive the second file sent by the server, and take the second file as the first file pre-stored in the terminal device in which values of operation parameters of the terminal device corresponding to various applications are recorded, where the value of the operation parameter of the terminal device corresponding to the application is determined based on the first file.

Figure 35:
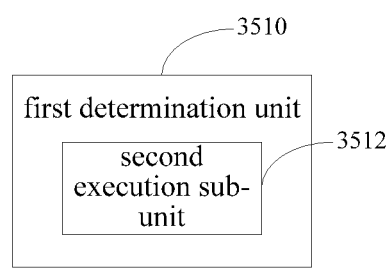
FIG. 35 is another structural diagram of a first determination unit according to an embodiment of the disclosure.

Optionally, FIG. 35 illustrates another structure of the first determination unit 3510 according to an embodiment of the disclosure. Referring to FIG. 35, the first determination unit 3510 includes a second execution sub-unit 3512.

The second execution sub-unit 3512 is configured to, in a case that the first file in which values of operation parameters of the terminal device corresponding to various applications are recorded is not pre-stored in the terminal device, receive the second file sent by the server, and determine the second file as the first file pre-stored in the terminal device in which values of operation parameters of the terminal device corresponding to various applications are recorded, where the value of the operation parameter of the terminal device corresponding to the application is determined based on the first file.

Figure 36:
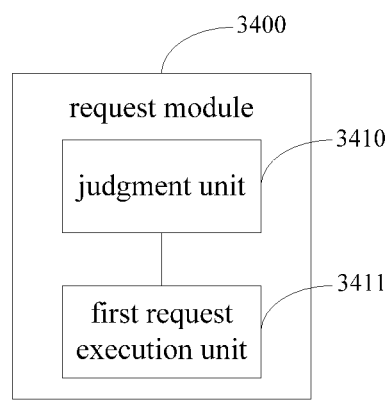
FIG. 36 is a structural diagram of a request module according to an embodiment of the disclosure.

Optionally, FIG. 36 illustrates a structure of the request module 3400 according to an embodiment of the disclosure. Referring to FIG. 36, the request module 3400 includes a judgment unit 3410 and a first request execution unit 3411.

The judgment unit 3410 is configured to judge whether the first file pre-stored in the terminal device in which values of operation parameters of the terminal device corresponding to various applications are recorded is the same as the second file.

The first request execution unit 3411 is configured to request the second file from the server in a case that the pre-stored first file is different from the second file.

Figure 37:
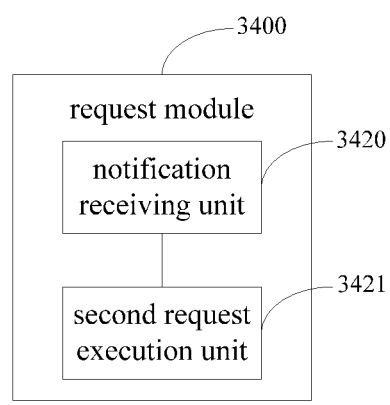
FIG. 37 is another structural diagram of a request module according to an embodiment of the disclosure.

Optionally, FIG. 37 illustrates another structure of the request module 3400 according to an embodiment of the disclosure. Referring to FIG. 37, the request module 3400 includes a notification receiving unit 3420 and a second request execution unit 3421.

The notification receiving unit 3420 is configured to receive an update notification message of the second file sent by the server in a case that the second file is updated.

The second request execution unit 3421 is configured to request the second file from the server.

In the embodiment of the disclosure, the value of the operation parameter of the terminal device corresponding to the used application is determined based on the first file in which values of operation parameters of the terminal device corresponding to various applications are recorded, and thus the operation parameter of the terminal device can be adjusted to be matched with the used application. Therefore, the adjusted operation parameter is matched with the software usage scenario of the terminal device, and unstandard operational energy consumption of software and poor operational smoothness are avoided.

A terminal device is further provided according to an embodiment of the disclosure, which includes the apparatus for adjusting the operation parameter of the terminal device described above. The description of the apparatus for adjusting the operation parameter of the terminal device may refer to the corresponding description above, which is not repeated herein.

Various embodiments of the specification are described in a progressive way, each embodiment lays emphasis on the difference from other embodiments, and for the same or similar parts between various embodiments, one may refer to the description of other embodiments. For the apparatus disclosed by the embodiments, since it corresponds to the method disclosed by the embodiments, the description of the apparatus is simple; and for the parts related to the method, one may refer to the description of the method embodiments.

As further be appreciated by those skilled in the art, the units and algorithmic steps in the examples described according to the embodiments disclosed herein can be implemented in forms of an electronic hardware, computer software or the combination of the both. To illustrate the interchangeability of the hardware and the software clearly, the components and the steps in the examples are described generally according to functions in the above description. Whether hardware or software is used to implement the functions depending on a specific application and design constraints for the technical solution. For each specific application, different methods may be used by those skilled in the art to implement the described function, and such implementation should not be considered to depart from the scope of this disclosure.

The method or algorithm steps described in conjunction with the disclosed embodiments herein may be performed by the hardware, a software module controlled by a processor or a combination thereof. The software module may be disposed at a Random Accessing Memory (RAM), a memory, an Read Only Memory (ROM), an electrically programmable ROM, an electrically programmable and erasable ROM, a register, a hard disc, a mobile magnetic disc, a CD-ROM or any other forms of storage mediums well-know for those skilled in the art.

The above illustration for the disclosed embodiments can enable those skilled in the art to implement or use the disclosure. Many changes to these embodiments are apparent for those skilled in the art, and general principles defined herein may be implemented in other embodiments without departing from the spirit or scope of the disclosure. Hence, the disclosure is not defined by the embodiments disclosed herein, but is to conform to the widest scope in consistent with principles and novel features disclosed herein.

What is claimed is:

1. A method for determining an application to be recommended, the method comprising:

obtaining, by a server, a notebook mode identification of a notebook usage mode and an application identification of an application run in the notebook usage mode from a first set of terminal devices on which the application is running under the notebook usage mode;

obtaining, by the server, a tablet mode identification of a tablet usage mode and an application identification of an application run in the tablet usage mode from a second set of terminal devices on which the application is running under the tablet usage mode, wherein each terminal device is capable of operating in the notebook usage mode or the tablet usage mode and each application corresponds to an unique application identification;

gathering, by the server, the notebook mode identifications, the tablet mode identifications, and the application identifications sent from the first set of terminal devices and the second set of terminal devices;

determining a type of a first application used by a first terminal device in the notebook usage mode based on an application identification of the first application indicating a maximum usage time of the first application in the notebook usage mode and determining a type of a second application used by the first terminal device in the tablet usage mode based on an application identification of the second application indicating a maximum usage time of the second application in the tablet usage mode, the maximum usage times is based on the gathered notebook mode identifications, tablet mode identifications, and application identifications, wherein the type comprises at least one of a communication type, an entertaining type, and a map type;

determining a first to-be recommended application of the type of the first application for the notebook usage mode of the first terminal device based on only the notebook mode identifications and application identifications of applications run in the notebook usage mode obtained from the gathered notebook mode identifications, tablet mode identifications, and application identifications, and determining a second to-be recommended application of the type of the second application for the tablet usage mode of the first terminal device based on only the tablet mode identifications and application identifications of applications run in the tablet usage mode obtained from the gathered notebook mode identifications, tablet mode identifications, and application identifications;

determining, by the server, whether the first terminal device is in the notebook usage mode or in the usage tablet mode;

recommending the first to-be recommended application to the first terminal device when the first terminal device is in the notebook usage mode; and recommending the second to-be recommended application to the first terminal device when the first terminal device is in the tablet usage mode.

2. The method according to claim 1, wherein gathering the notebook mode identifications, the tablet mode identifications, and the application identifications sent from the first set of terminal devices and the second set of terminal devices comprises:

determining the notebook mode identifications, the tablet mode identifications, and the application identifications sent from the terminal device located in a set region, wherein the terminal devices located in the set region are determined from the first set of terminal devices and the second set of terminal devices.

3. The method according to claim 2, wherein determining the first to-be recommended application and the second to-be recommended application comprises: determining the application meets a predetermined condition for each of the notebook and tablet usage modes based on the gathered notebook mode identifications, the tablet mode identifications, and application identifications, wherein determining the application meets the predetermined condition further comprises:

calculating a number of times the application identification of each application appears under each of the notebook and tablet usage modes based on the notebook mode identifications, the tablet mode identifications, and the application identifications sent from the terminal device located in a set region; and determining applications used by the terminal device located in a set region and ranked in a descending order of the number of times the application identification of each application appears under each of the notebook and tablet usage modes.

4. The method according to claim 2, further comprising:

obtaining, from each terminal device, region identification information of a region where the terminal device is located, wherein the region where the terminal device is located is same as or different from the set region; and wherein determining the notebook mode identifications, the tablet mode identifications, and application identifications sent from the terminal device located in the set region comprises:

classifying the application identifications and determining notebook mode identifications, tablet mode identifications, and application identifications corresponding to set region identification information based on the region identification information and the notebook mode identifications and the tablet mode identifications, wherein the set region identification information corresponds to the set region.

5. The method according to claim 1, further comprising:

obtaining first application information corresponding to the first to-be recommended application to be recommended for the notebook usage mode or second application information corresponding to the second to-be recommended application to be recommended for the tablet usage mode;

generating first application recommending information comprising the first application information or second application recommending information comprising the second application information; and sending the first application recommending information when the first terminal in the notebook usage mode or sending the second application recommending information when the first terminal is in the tablet usage mode.

6. The method according to claim 5, wherein determining whether the first terminal device is in at least one of the notebook usage mode or the tablet usage mode comprises:

sending inquiry information for inquiring a current usage mode to the first terminal device;

receiving a mode identification of the current usage mode sent from the first terminal device after the first terminal device receives the inquiry information and sends the mode identification of the current usage mode; and determining whether the first terminal is in at least one of the notebook usage mode or the tablet usage mode based on the received mode identification of the current usage mode.

7. An apparatus for determining an application to be recommended, comprising a memory and a processor, wherein the memory stores program codes that are executable by the processor to cause the processor to:

obtain a notebook mode identification of a notebook usage mode and an application identification of an application run in the notebook usage mode from a first set of terminal devices on which the application is running under the notebook usage mode;

obtain a tablet mode identification of a tablet usage mode and an application identification of an application run in the tablet usage mode from a second set of terminal devices on which the application is running under the tablet usage mode, wherein each terminal device is capable of operating in the notebook usage mode or the tablet usage mode and each application corresponds to an unique application identification;

gather the notebook mode identifications, the tablet mode identifications, and the application identifications sent from the first set of terminal devices and the second set of terminal devices;

determine a type of a first application used by a first terminal device in the notebook usage mode based an application identification of the first application indicating a maximum usage time of the first application in the notebook usage mode and determine a type of a second application used by the first terminal device in the tablet usage mode based on an application identification of the second application indicating a maximum usage time of the second application in the tablet usage mode, the maximum usage times is based on the gathered notebook mode identifications, tablet mode identifications, and application identifications, wherein the type comprises at least one of a communication type, an entertaining type, and a map type;

determine a first to-be recommended application of the type of the first application for the notebook usage mode of the first terminal device based on only the notebook mode identifications and application identifications of applications run in the notebook usage mode obtained from the gathered notebook mode identifications, tablet mode identifications, and application identifications, and determine a second to-be recommended application of the type of the second application for the tablet usage mode of the first terminal device based on only the tablet mode identifications and application identifications of applications run in the tablet usage mode obtained from the gathered notebook mode identifications, tablet mode identifications, and application identifications;

determine whether the first terminal device is in the notebook usage mode or in the tablet usage mode; and recommend the first to-be recommended application to the first terminal device when the first terminal device is in the notebook usage mode; and recommend the second to-be recommended application to the first terminal device when the first terminal device is in the tablet usage mode.

8. The apparatus according to claim 7, wherein the program codes executable by the processor further cause the processor:

determine the notebook mode identifications, the tablet mode identifications, and the application identifications sent from terminal devices located in a set region, wherein the terminal devices located in the set region are determined from the first set of terminal devices and the second set of terminal devices; and calculate a number of times the application identification of each application appears under each of the notebook and tablet usage modes based on the notebook mode identifications, the tablet mode identifications, and the application identifications sent from the terminal device located in a set region; and determine applications used by the terminal device located in the set region and ranked in a descending order of number of times the application identification of each application appears under each of the notebook and tablet usage modes.

9. The apparatus according to claim 7, wherein the program codes executable by the processor further cause the processor to:

obtain, from each terminal device, region identification information of a region where the terminal device is located, wherein the region where the terminal device is located is same as or different from a set region; and classify the application identifications and determining notebook mode identifications, tablet mode identifications, and application identifications corresponding to set region identification information based on the region identification information and the notebook mode identifications and the tablet mode identifications, wherein the set region identification information corresponds to the set region.

10. The apparatus according to claim 7, wherein the program codes executable by the processor further cause the processor to:

obtain first application information corresponding to the first to-be recommended application for the notebook usage mode or second application information corresponding to the second to-be recommended application the tablet usage modes;

generate first application recommending information comprising the first application information or second application recommending information comprising the second application information;

determine a current usage mode of the first terminal device; and send the first application recommending information when the first terminal is in the notebook usage mode or send the second application recommending information when the first terminal is in the tablet usage mode.

11. The apparatus according to claim 10, wherein the program codes executable by the processor further cause the processor to:

send inquiry information for inquiring a current usage mode to the first terminal device;

receive a mode identification of the current usage mode sent from the first terminal device after the first terminal device receives the inquiry information and sends the mode identification of the current usage mode; and determine whether the first terminal is in at least one of the notebook usage mode or the tablet usage mode based on the received mode identification of the current usage mode.

* * * * *